(12) United States Patent
Orellana

(10) Patent No.: US 7,610,180 B1
(45) Date of Patent: Oct. 27, 2009

(54) COMPUTER IMPLEMENTED SYSTEM FOR LUMINAIRE DESIGN

(75) Inventor: Angel Orellana, Los Angeles, CA (US)

(73) Assignee: U.S. Pole Company, Inc., Palmdale, CA (US)

(*) Notice: Subject to any disclaimer, the term of this patent is extended or adjusted under 35 U.S.C. 154(b) by 428 days.

(21) Appl. No.: 11/188,290

(22) Filed: Jul. 21, 2005

Related U.S. Application Data

(63) Continuation-in-part of application No. 11/077,186, filed on Mar. 10, 2005, now abandoned.

(60) Provisional application No. 60/551,942, filed on Mar. 10, 2004.

(51) Int. Cl.
*G06F 17/50* (2006.01)

(52) U.S. Cl. .................................. 703/1

(58) Field of Classification Search .............. 703/1, 703/6; 362/147, 368
See application file for complete search history.

(56) References Cited

U.S. PATENT DOCUMENTS 7,097,330 B1 * 8/2006 Straus et al. ............. 362/368

OTHER PUBLICATIONS

Farrell, W. Luminaire Design Criteria for HID Light Sources, IEEE Transactions on Industry Applications, Mar. 1975, pp. 226-8.*

Lewin, I. Luminaire Design Related to Visibility, IEEE Transactions on Industry Applications, Sep. 1973, pp. 539-544.*

Kloczkowski et al., R. Lighting Design Considerations of Reflectorized Luminaires, Conference Record of the 1989 IEEE Industry Applications Society Annual Meeting, Oct. 1989, pp. 2343-2349.*

Gardner et al., J. Computer Based Photometric Calculations Provide Savings for Industrial Lighting Projects, IEEE Industrial Applications Society 48th Annual Petroleum and Chemical Industry Conference, Sep. 2001, pp. 101-109.*

Ruffles, P. Information Technology and Buildings—Lighting of IT Work Places, IEE Colloquium on Information Technology and Buildings, Jan. 1997, pp. 5/1-5/5.*

* cited by examiner

*Primary Examiner*—Russell Frejd
(74) *Attorney, Agent, or Firm*—Christie, Parker & Hale LLP

(57) ABSTRACT

A computer implemented system for assisting an operator in designing and customizing a virtual luminaire by selecting options. As the operator selects options, the system may display a sample of that option or a sample of the final luminaire. The system may adjust the options that the operator may select to prevent the operator from selecting incompatible or undesirable combinations of options. The system may make recommendations for placement of an option or additional options. The system may stores copies of the luminaire, usable for incorporation into documents or files that can be printed or submitted electronically. Additional information such as pricing or inventory data may also be provided.

17 Claims, 46 Drawing Sheets

FIG. 33

SAVING A WORD DOCUMENT

TO SAVE THE DESIGN AND ORDERING INFORMATION YOU CREATED INTO A WORD DOCUMENT PLEASE DO THE FOLLOWING:

1. CLOSE THIS ACROBAT PROGRAM (PRINT THIS INSTRUCTIONS FIRST IF YOU NEED TO).
2. CLICK ON THE MAXIMIZE BUTTON (SEE BELOW).
3. FIND THE "PRINT SCREEN" BUTTON ON YOUR KEYBOARD AND PRESS IT.
4. OPEN A NEW MICROSOFT WORD DOCUMENT.
5. SELECT "EDIT" FROM THE TOOLS MENU, SELECT "PASTE" AND YOU SHOULD SEE SOMETHING SIMILAR TO THE IMAGE AT BOTTOM.
6. NOW YOU CAN SAVE THIS DOCUMENT AND E-MAIL TO SUN VALLEY LIGHTING (info@sunvalleylighting.com) OR YOU CAN E-MAIL IT TO YOUR CUSTOMER.

FIG. 45

MAXIMIZE BUTTON

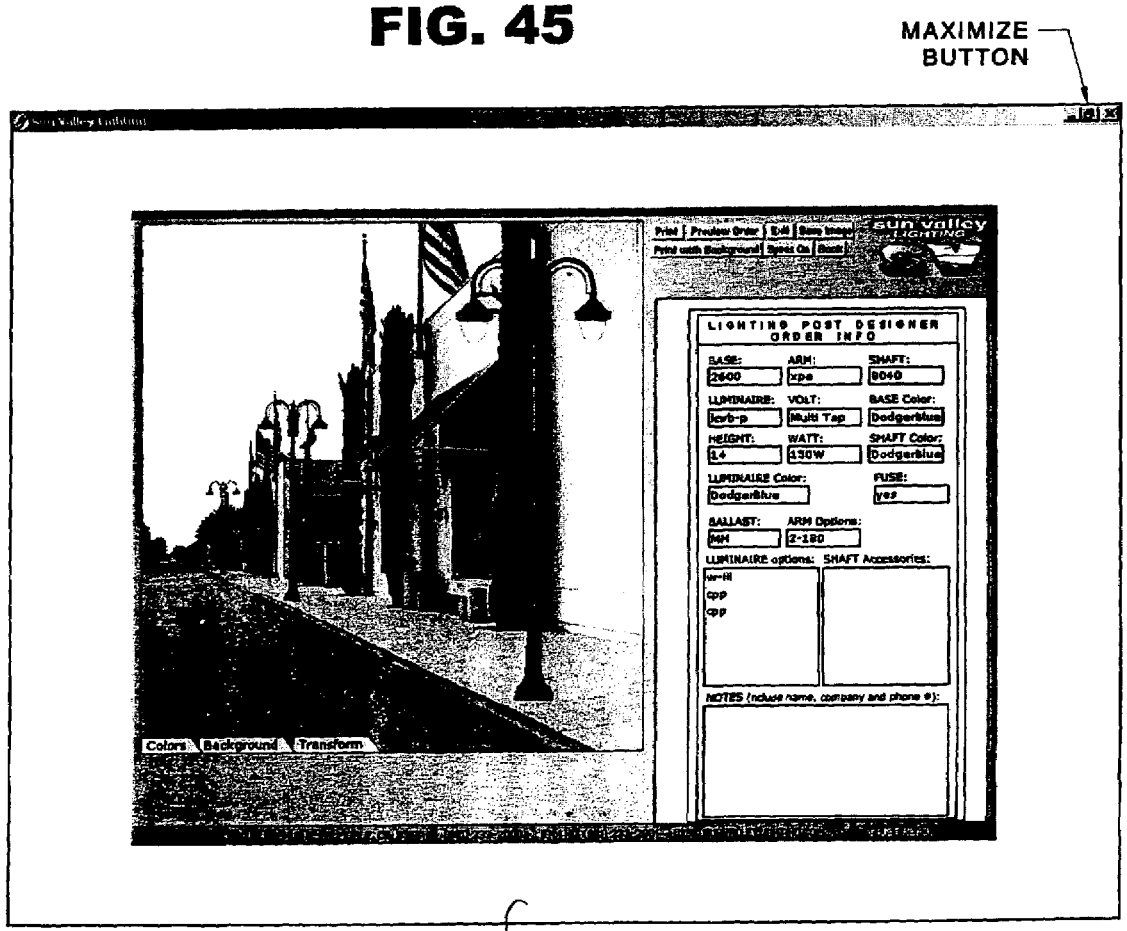

COMPUTER IMPLEMENTED SYSTEM FOR LUMINAIRE DESIGN

CROSS-REFERENCE TO RELATED APPLICATIONS

This application is a continuation-in-part of application Ser. No. 11/077,186, filed Mar. 10, 2005 (now abandoned), which claimed the benefit of the filing date of U.S. Provisional Application No. 60/551,942, filed Mar. 10, 2004, the entire contents of which are incorporated herein by reference.

FIELD OF THE INVENTION

The present invention relates generally to a computer-implemented system for designing luminaires, and more particularly to an environment for designing and submitting orders for luminaires.

BACKGROUND OF THE INVENTION

Customarily, a luminaire is constructed from a number of separate parts, e.g., a base, a pole, and a lamp. Sometimes, the lamp is attached to the pole by one or more arms. A customer can select from a number of choices for each part of the luminaire. Traditionally, a customer selects the parts for the luminaire from a catalog. The customer does not see the actual luminaire until it is assembled.

Luminaires have become increasingly complex, and customer demands have required that a variety of options be made available for customizing the luminaire. In addition to allowing customers to select the basic components of a luminaire such as a base, arm, and shaft, manufacturers may also allow a customer to customize the luminaire by selecting a specific receptacle, cover, arm, banner eyebolt, banner arm, basket holder, street sign, ladder rest, flag holder, internal louver, prismatic glass reflector, finial, material, type of lighting, ballast, shield, voltage, color, fuse, mount, and other options. Height, placement, and orientation of each option may also be customized.

Offering custom luminaires presents several problems. Since a customer does not see the actual luminaire until it has been assembled, the customer may receive an item that he or she did not expect. Further, it may be difficult for a customer to decide what options he or she prefers without seeing the luminaire in the context of the environment in which it will be placed. Further, if a customer places an order over the phone or by fax, mailing, or email, there is an increased likelihood of errors resulting from data entry or miscommunication as well as additional costs associated with manually processing the order.

Therefore, there is a need for a system which can assist a customer in evaluating and customizing the design of a luminaire before submitting an order and that can assist a customer in submitting the order with a decreased likelihood of error.

SUMMARY OF THE INVENTION

In an exemplary embodiment of the present invention, the invention includes a computer implemented system for assisting an operator in designing and customizing a virtual luminaire by selecting options. As the operator selects options, the system may display a sample of that option or a sample of the final luminaire. The system may adjust the options that the operator may select to prevent the operator from selecting incompatible or undesirable combinations of options. The system may also make recommendations for placement of an option or additional options. Additional information such as pricing or inventory data may also be provided. Multiple luminaires may be displayed and customized side by side.

In another exemplary embodiment of the present invention, the invention includes a computer implemented system for assisting an operator in previewing a virtual luminaire in the context of a picture or graphical representation of its surroundings. This may be achieved by displaying a picture or graphical representation with the virtual luminaire placed in it. The virtual luminaire and the background graphic or picture may also be adjusted by the operator for location, size, color, and picture settings.

In yet another exemplary embodiment of the present invention, the invention includes a computer implemented system for assisting an operator in submitting a list of part numbers and options for a luminaire to a manufacturer. This may be achieved by printing an order summary page that lists the selected part numbers, descriptions, and quantities. The order summary page may also be transmitted to a manufacturer or third party by electronic communication such as email or otherwise through a computer network. The operator may provide purchase information or additional information to accompany the order information.

In one aspect of the invention, an apparatus allows designing luminaires from sets of interchangeable parts such that one part from each set fits with one part from each of the other sets to form a complete luminaire: the apparatus includes a display device having a screen, a memory for storing images of the parts, a microprocessor programmed to display the stored images, and an input device for selecting one part from each set required to form a complete luminaire. The microprocessor is programmed to assemble on the screen the complete luminaire from the selected parts.

In another aspect of the invention, a system allows designing and ordering luminaires: the system includes a user interface including a display for selecting parts of a luminaire from different designs and for displaying a luminaire composed of the selected parts and a copy buffer capable of storing copies of the luminaire, usable for incorporating the luminaire into a document or file that can be printed or submitted electronically.

In yet another aspect of the invention, a method allows designing luminaires from sets of interchangeable parts such that one part from each set fits with one part from each of the other sets to form a complete luminaire: the method includes receiving input via an interface, the input representing a selection of interchangeable parts, displaying the complete luminaire or a partially complete luminaire composed of the selection of interchangeable parts, and storing the complete luminaire or the partially complete luminaire for the purpose of incorporating the complete luminaire or the partially complete luminaire into a document or a file that can be printed or submitted electronically.

In yet another aspect of the invention, a computer program product recorded on a computer readable medium allows designing luminaires from sets of interchangeable parts such that one part from each set fits with one part from each of the other sets to form a complete luminaire: the computer program product includes computer readable program code with a software interface for receiving input, the input representing a selection of interchangeable parts, computer readable program code for displaying the complete luminaire or a partially complete luminaire composed of the selection of interchangeable parts, and computer readable program code for storing the complete luminaire or the partially complete luminaire for the purpose of incorporating the complete luminaire or the partially complete luminaire into a document or a file that can be printed or submitted electronically.

BRIEF DESCRIPTION OF THE DRAWINGS

These and other aspects of the present invention will become more apparent from the following description of certain exemplary embodiments of the present invention in conjunction with the accompanying drawings and exhibits, in which:

FIG. 33 shows an on-screen display illustrating operator selection of the system's order information of FIG. 4;

FIG. 45 shows instructions for saving a virtual luminaire design as a Microsoft Word document.

Figure 1:
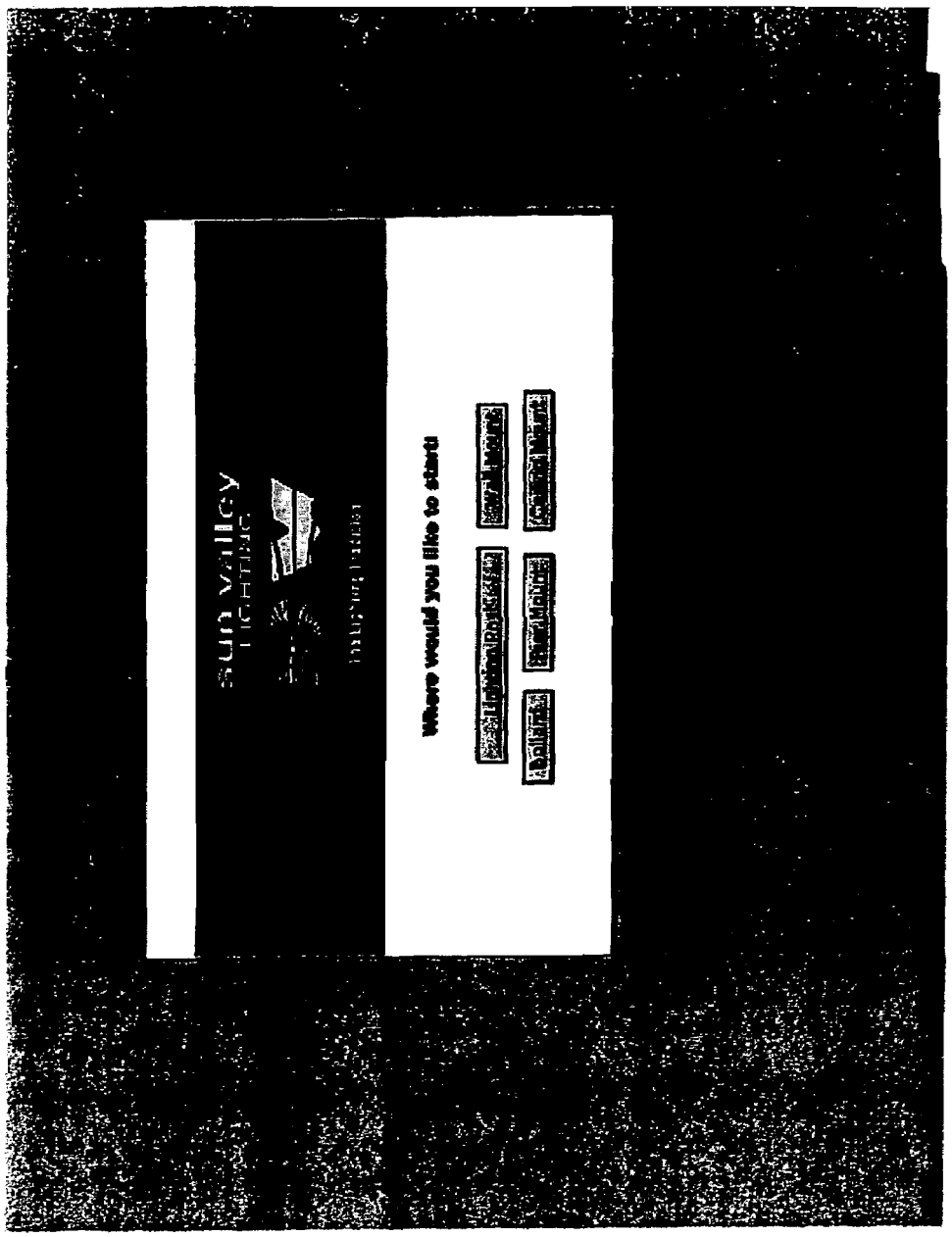
FIG. 1 is an opening screen of a series of displays that enable a customer to design and display a virtual luminaire from an electronic catalog of parts.

The flow diagrams, block diagrams, and screen shots representing the system and the process of using the same in the drawings are not intended to limit the present invention to a method of programming or a specific design of the system.

These representations merely show certain exemplary embodiments of the present invention.

DETAILED DESCRIPTION

FIG. 1 depicts the opening screen displayed when the system disk is installed in the drive of a computer that is running the program described below. In the opening screen, the user can select where to start the process of designing a virtual luminaire.

FIGS. 2 to 14 illustrate the flow in operating the system. FIGS. 15 to 46 depict the on-screen displays generated by the system disk. The on-screen displays of FIGS. 15 to 45 all have certain common features. The individual available parts are displayed in a large field 1500 on the left side of the screen and the selected parts are displayed in a large field 1502 on the right side of the screen.

Figure 2:
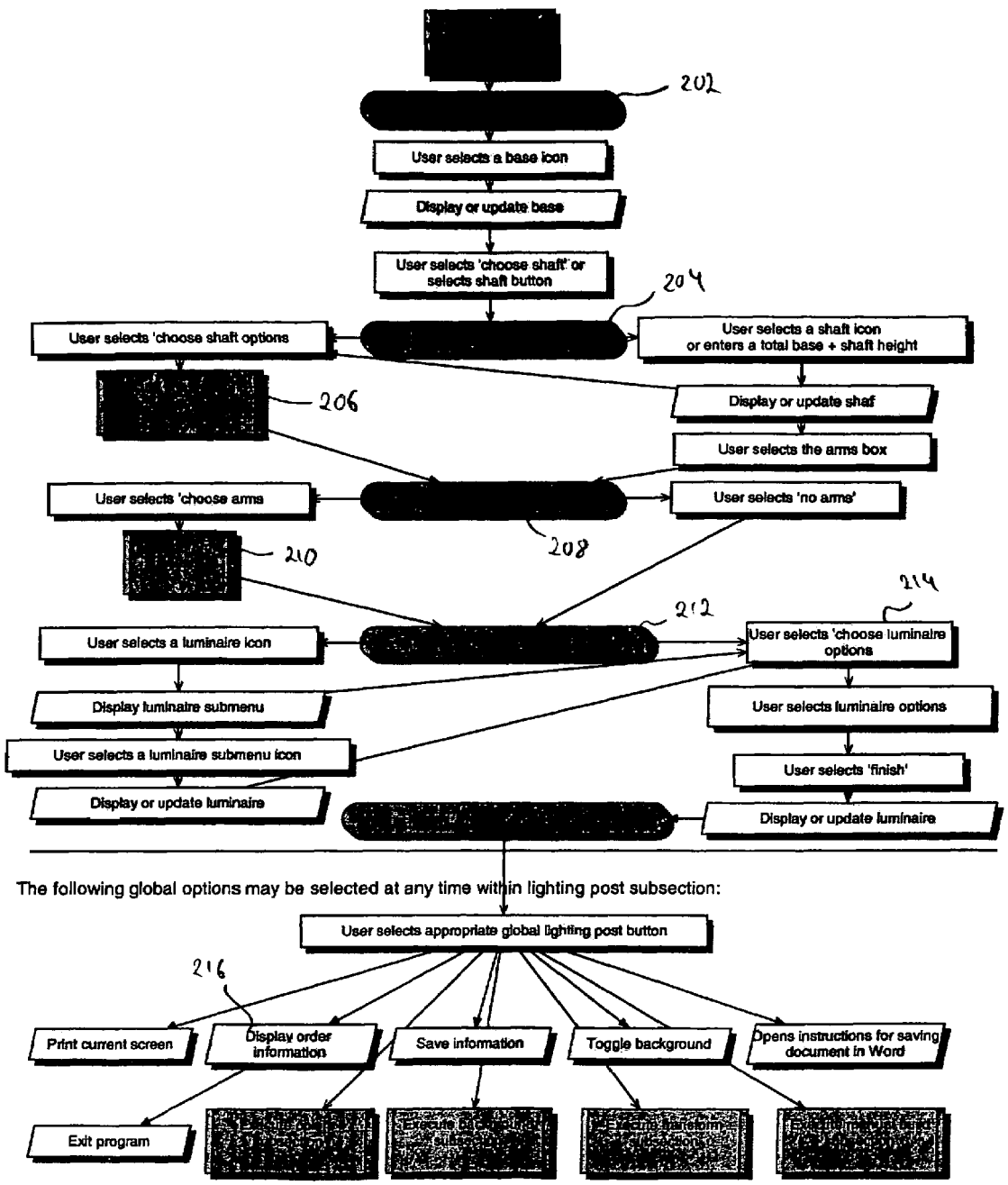
FIG. 2 is a flow diagram illustrating an exemplary process for assisting an operator in designing and customizing a lighting post luminaire.

Referring to FIG. 2, the customer provides input to the lighting post luminaire section of the system by selecting the desired components and options. As part of the lighting post section, the customer may select a base, shaft, arms, and luminaire. The options and components may be presented to the operator in a variety of formats or displays. In the exemplary embodiment shown in FIG. 2, a series of menus, including icons representing the components is shown to the customer. In addition to selecting icons, a customer may enter data manually, such as a shaft height. As the customer selects the components and options, a virtual luminaire is displayed on the screen. A novice operator of the system may build a virtual luminaire with ease by following the on screen instructions. An advanced operator may jump through the program to provide greater flexibility. For example, an operator may, at any time, print the current screen, display order information, save information, toggle the background, open instructions for saving the document, exit the program, modify the colors, modify the background, transform the image, or manually enter specifications.

Figure 3:
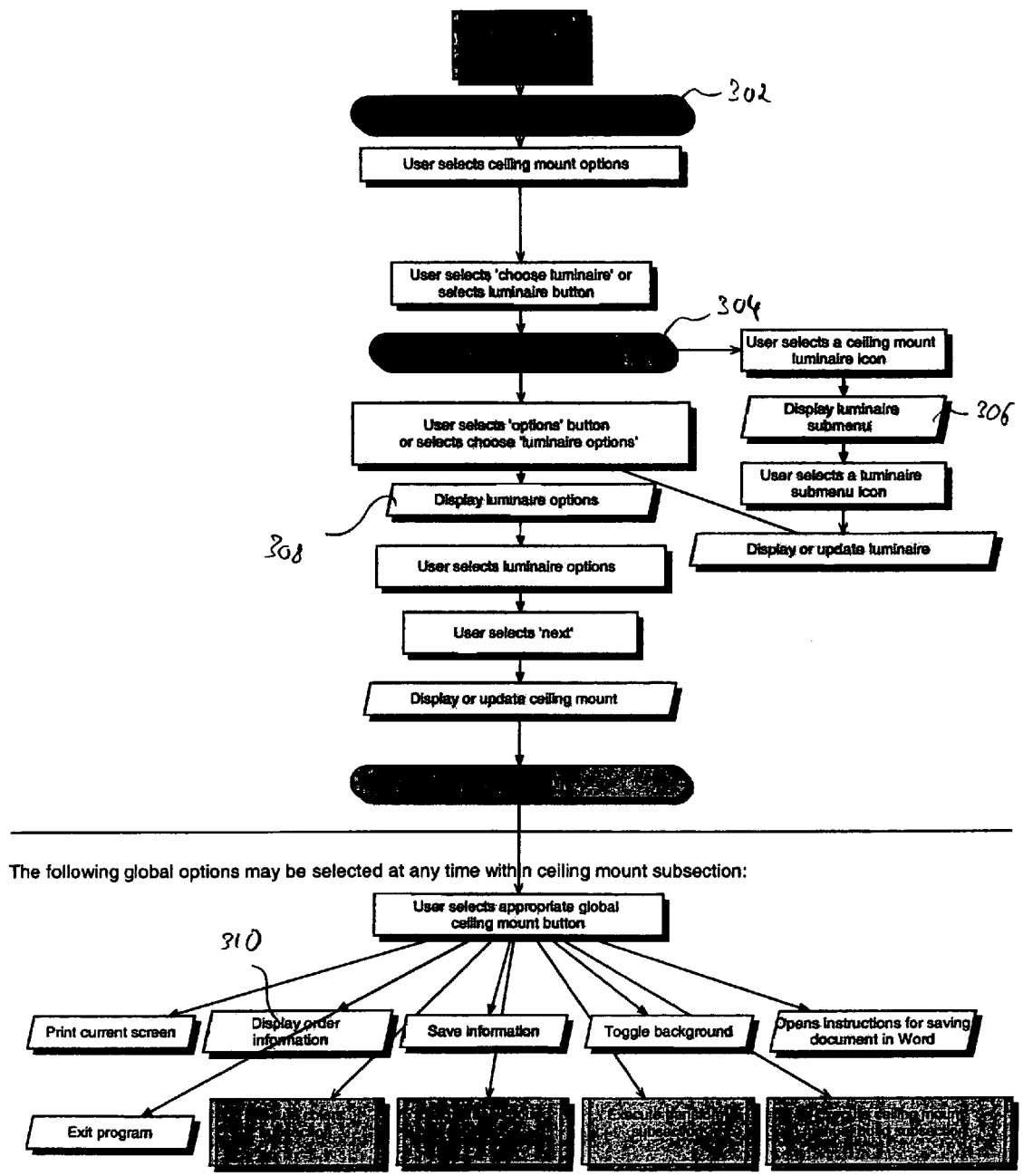
FIG. 3 is a flow diagram illustrating an exemplary process for assisting an operator in designing a ceiling mount luminaire.
Figure 4:
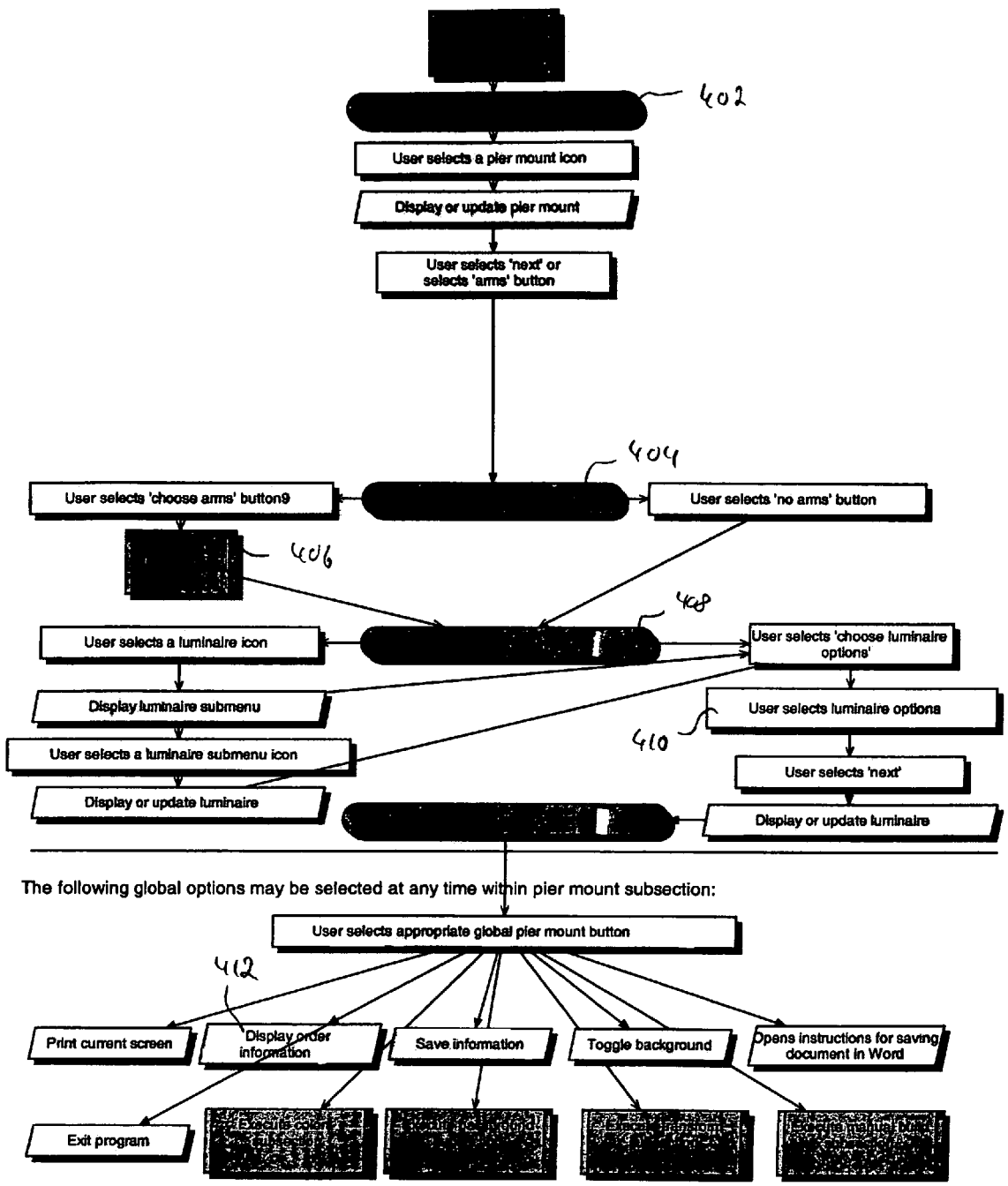
FIG. 4 is a flow diagram illustrating an exemplary process for assisting an operator in designing a pier mount luminaire.
Figure 5:
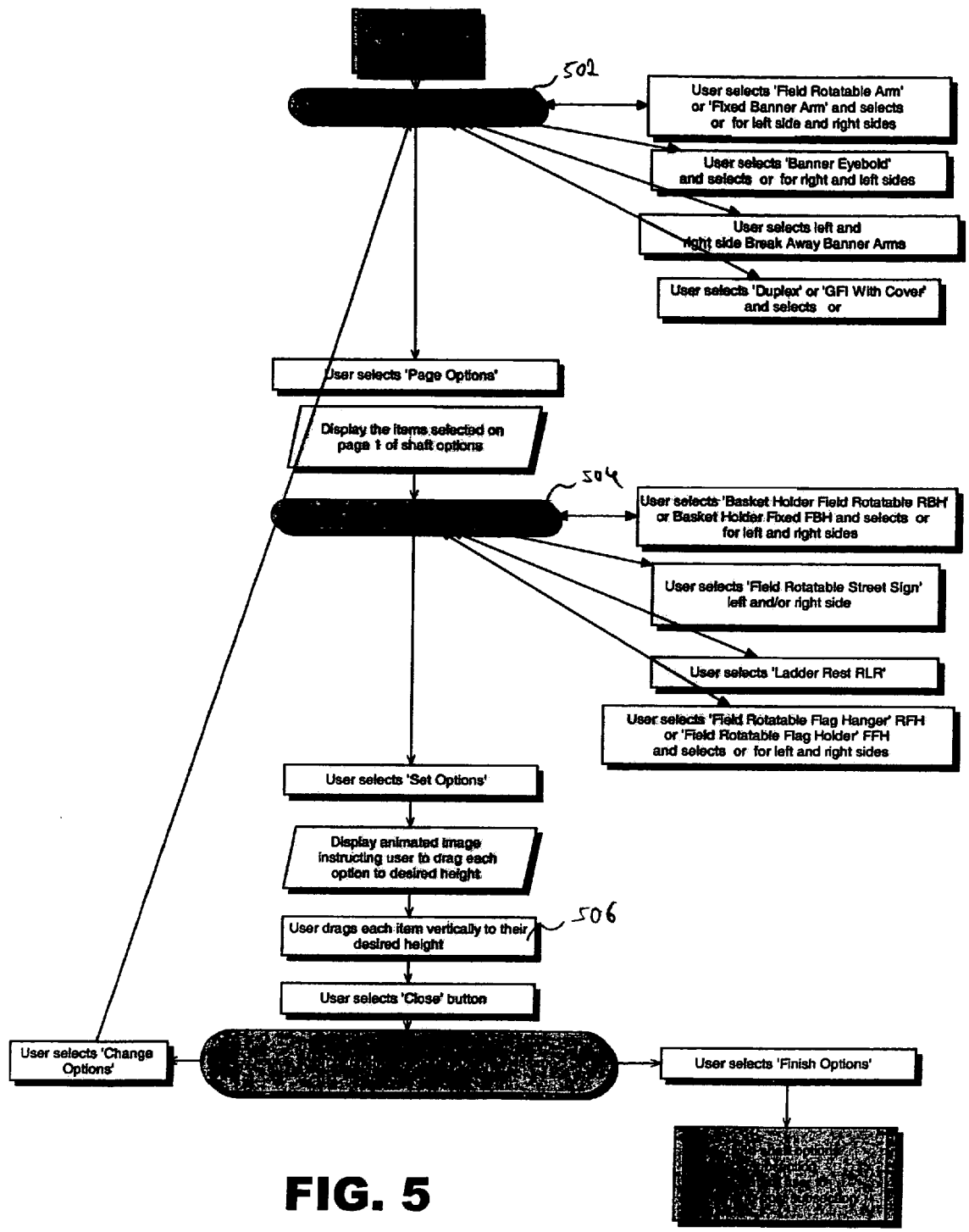
FIG. 5 is a flow diagram illustrating an exemplary process for assisting an operator in selecting shaft options for a luminaire.
Figure 6:
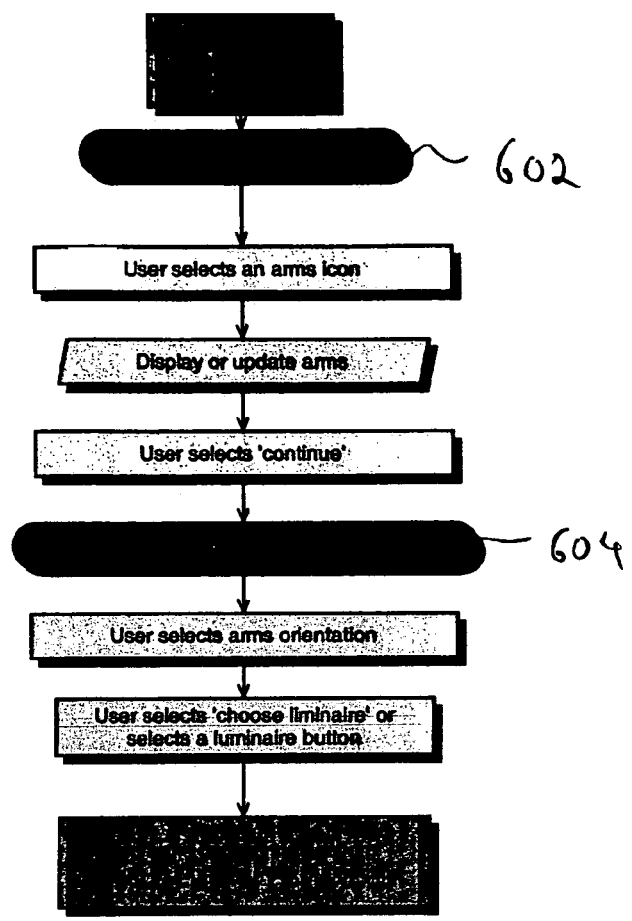
FIG. 6 is a flow diagram illustrating an exemplary process for assisting an operator in selecting arms for a luminaire.
Figure 7:
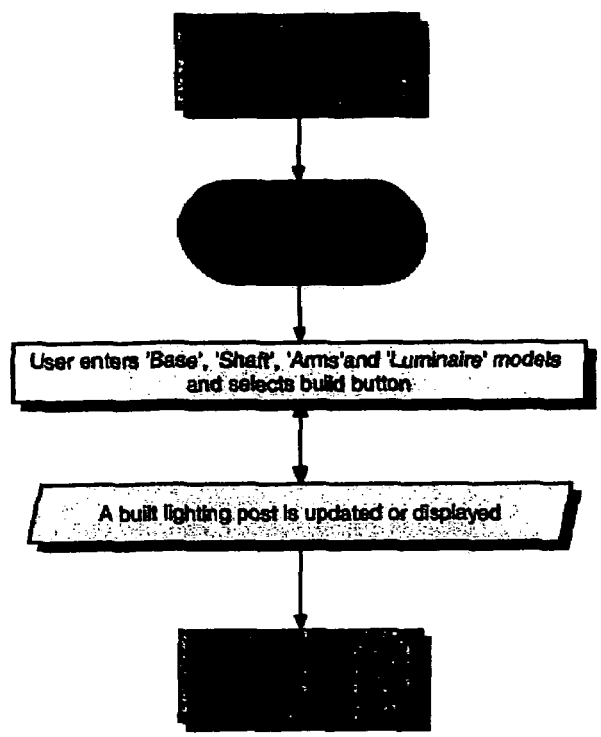
FIG. 7 is a flow diagram illustrating an exemplary process for assisting an operator in selecting a lighting post luminaire by manually entering models for each component and option.
Figure 8:
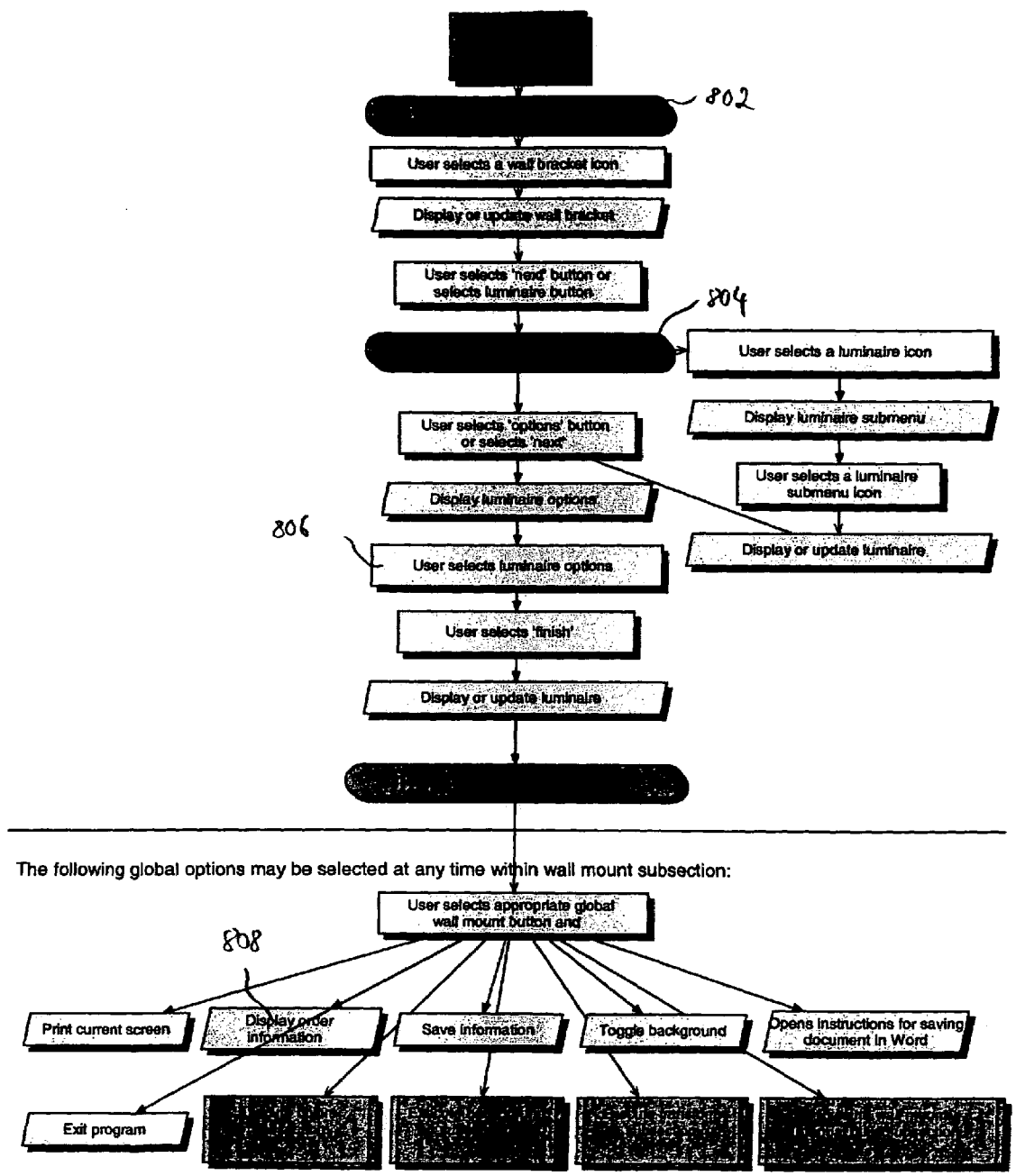
FIG. 8 is a flow diagram illustrating an exemplary process for assisting an operator in designing a wall mount luminaire.
Figure 9:
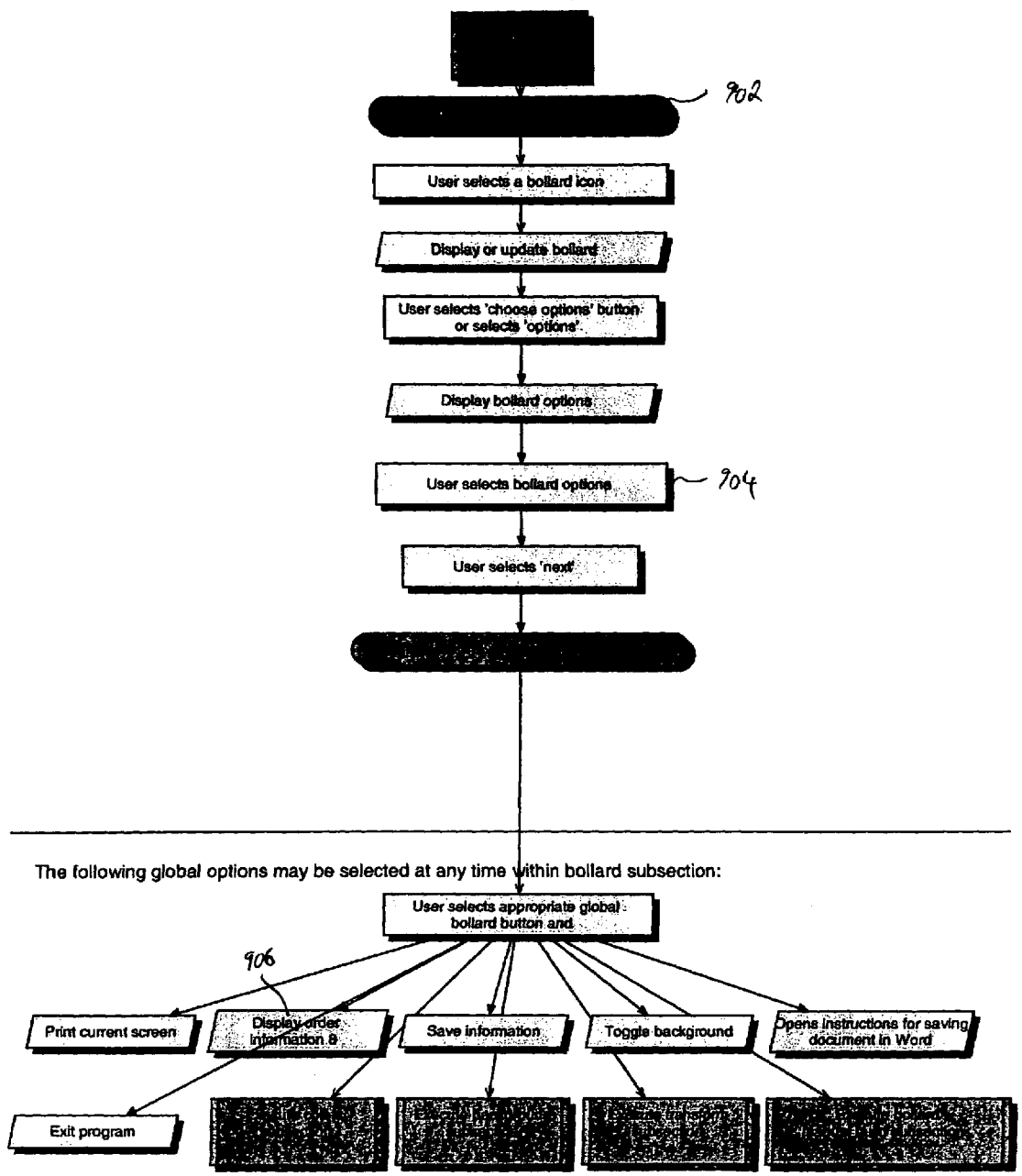
FIG. 9 is a flow diagram illustrating an exemplary process for assisting an operator in designing a bollard luminaire.
Figure 10:
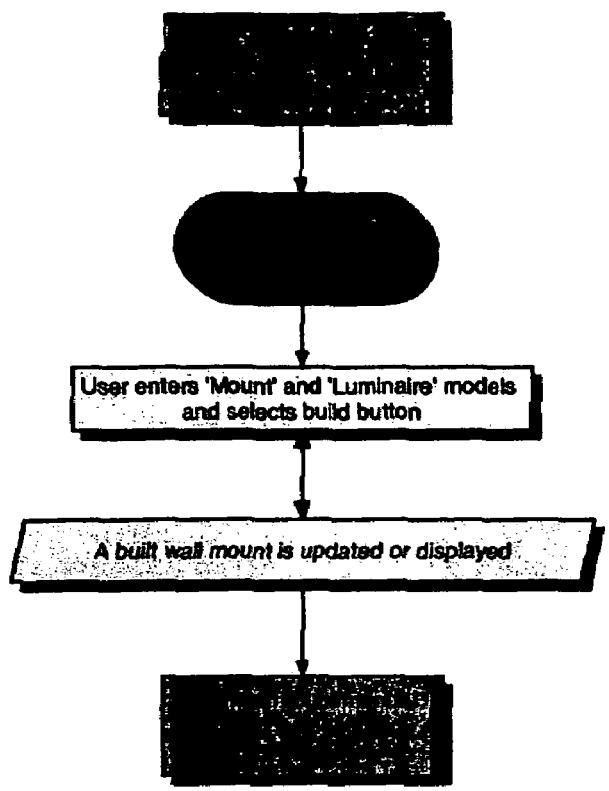
FIG. 10 is a flow diagram illustrating an exemplary process for assisting an operator in designing a wall mount luminaire by manually entering model numbers for each component and option.
Figure 11:
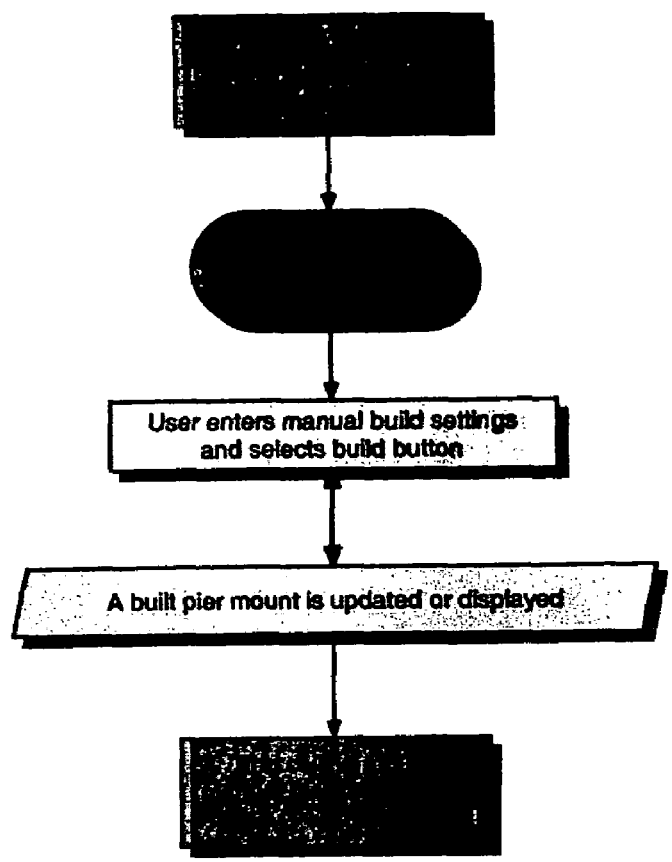
FIG. 11 is a flow diagram illustrating an exemplary process for assisting an operator in designing a ceiling mount luminaire by manually entering model numbers for each component and option.
Figure 12:
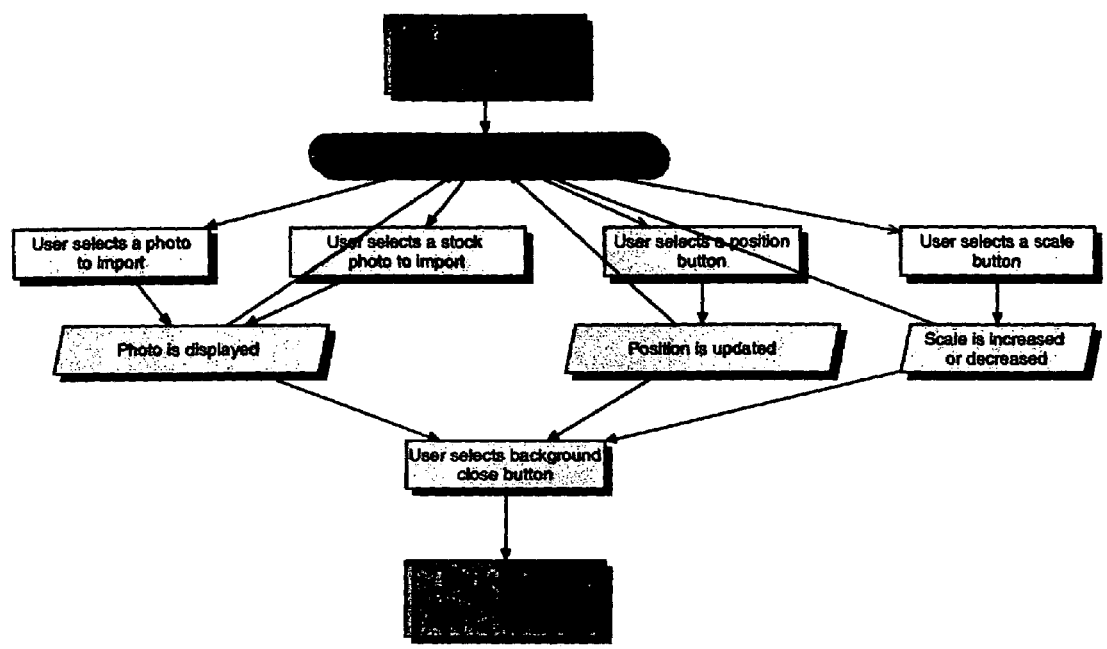
FIG. 12 is a flow diagram illustrating an exemplary process for previewing a virtual luminaire in the context of a picture or graphical representation of its surroundings by displaying a picture or graphic and displaying the luminaire placed in it.
Figure 13:
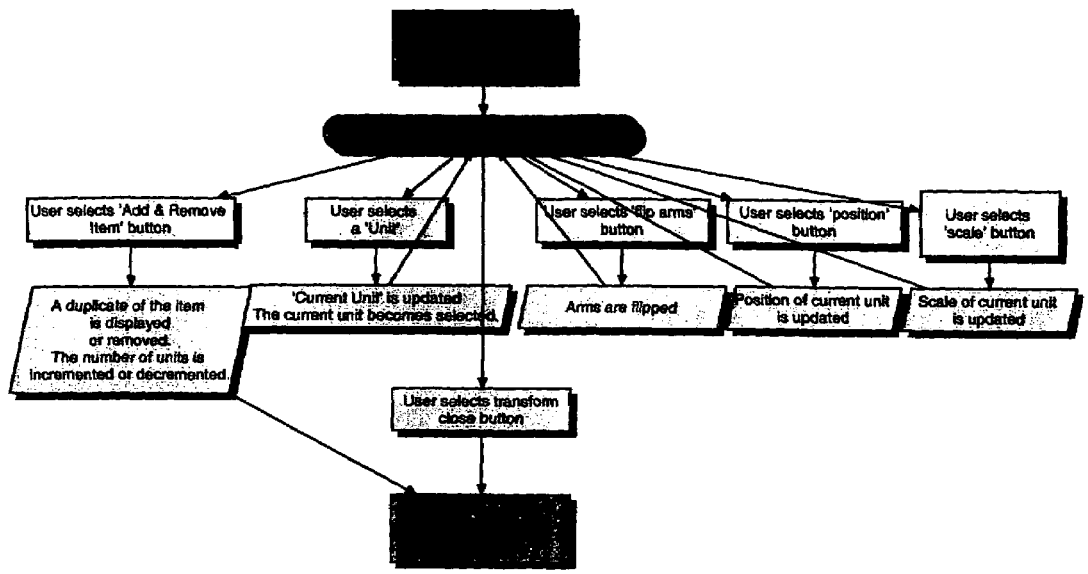
FIG. 13 is a flow diagram illustrating an exemplary process for assisting an operator in transforming the settings of a virtual luminaire.
Figure 14:
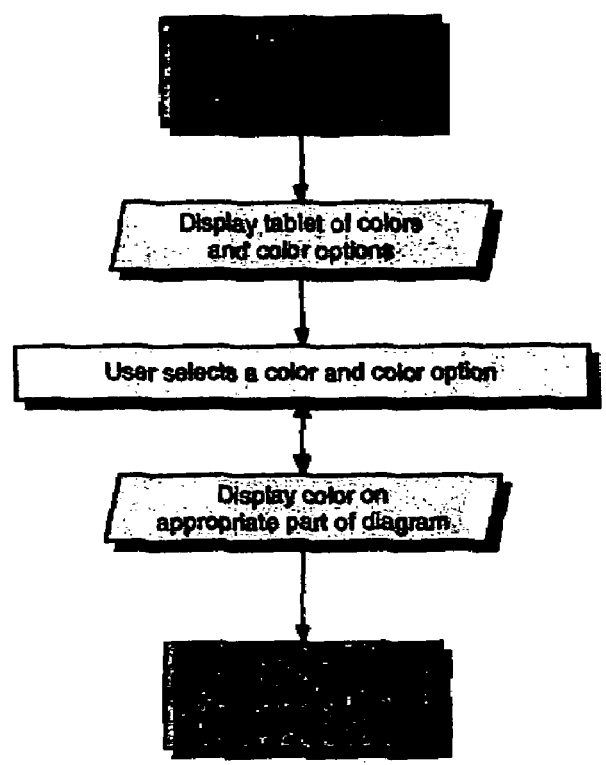
FIG. 14 is a flow diagram illustrating an exemplary process for previewing a virtual luminaire where the operator may adjust the color of the virtual luminaire.

FIGS. 3, 4, 5, 6, 7, 8, 9, 10, 11, 12, 13 and 14 show how a customer may select other features of a luminaire in a similar way as FIG. 2 shows the selection of the lighting post. FIG. 3 shows how to select a ceiling mount. FIG. 4 shows how to select a pier mount. FIG. 5 shows how to select a shaft. FIG. 6 shows how to select arms. FIG. 7 shows how to a customer can use a "manual build" option, an accelerated way of selecting a luminaire. FIG. 8 shows how to select wall mounts. FIG. 9 shows how to select bollards. FIG. 10 shows how to select wall mounts via "manual build" option. FIG. 11 shows how to select ceiling mounts via "manual build" option. FIG. 12 shows how to select a background. FIG. 13 shows how selected luminaires can be modified via a "transform" option. FIG. 14 shows how to select colors.

Figure 15:
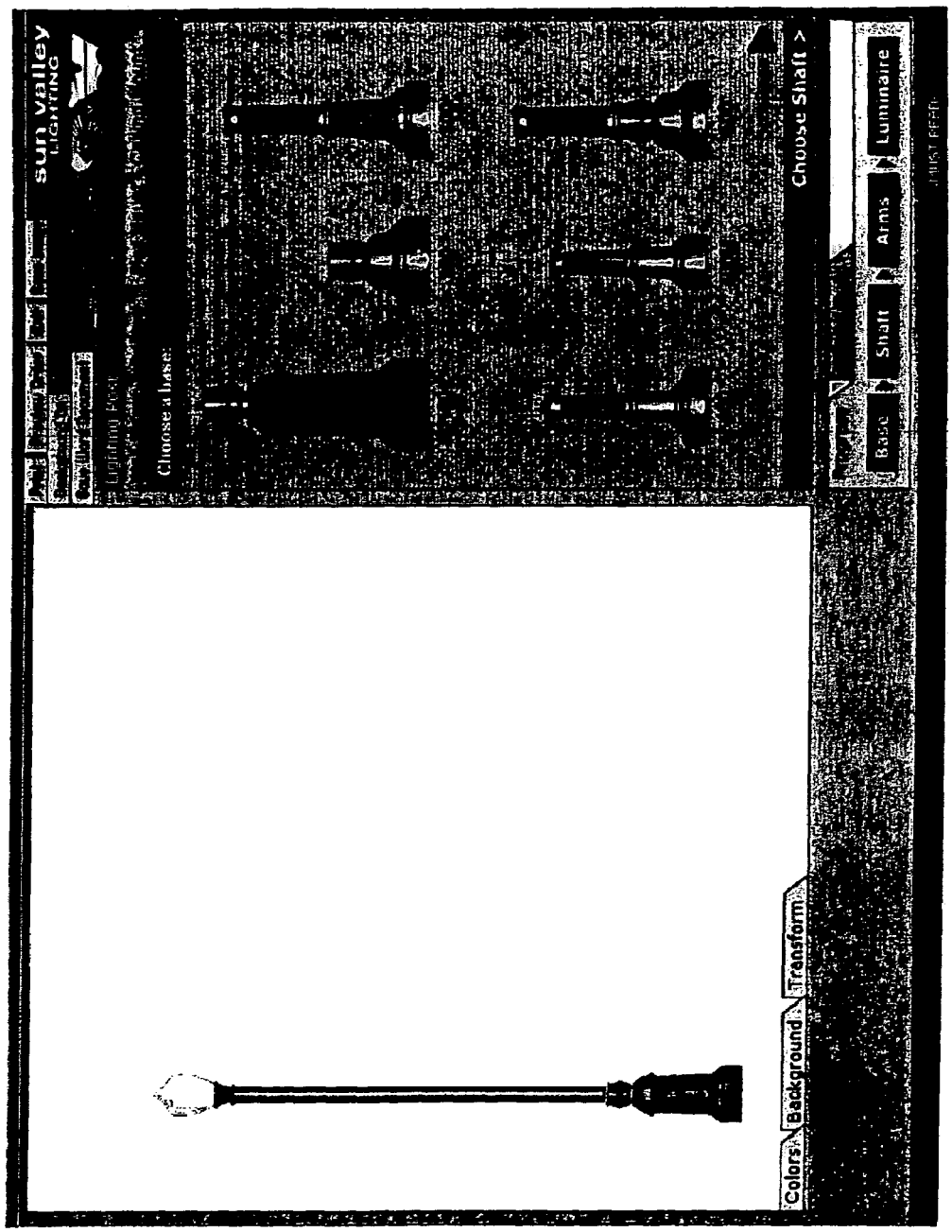
FIG. 15 shows an on-screen display illustrating operator selection of the system's lighting post base options of FIG. 2.
Figure 16:
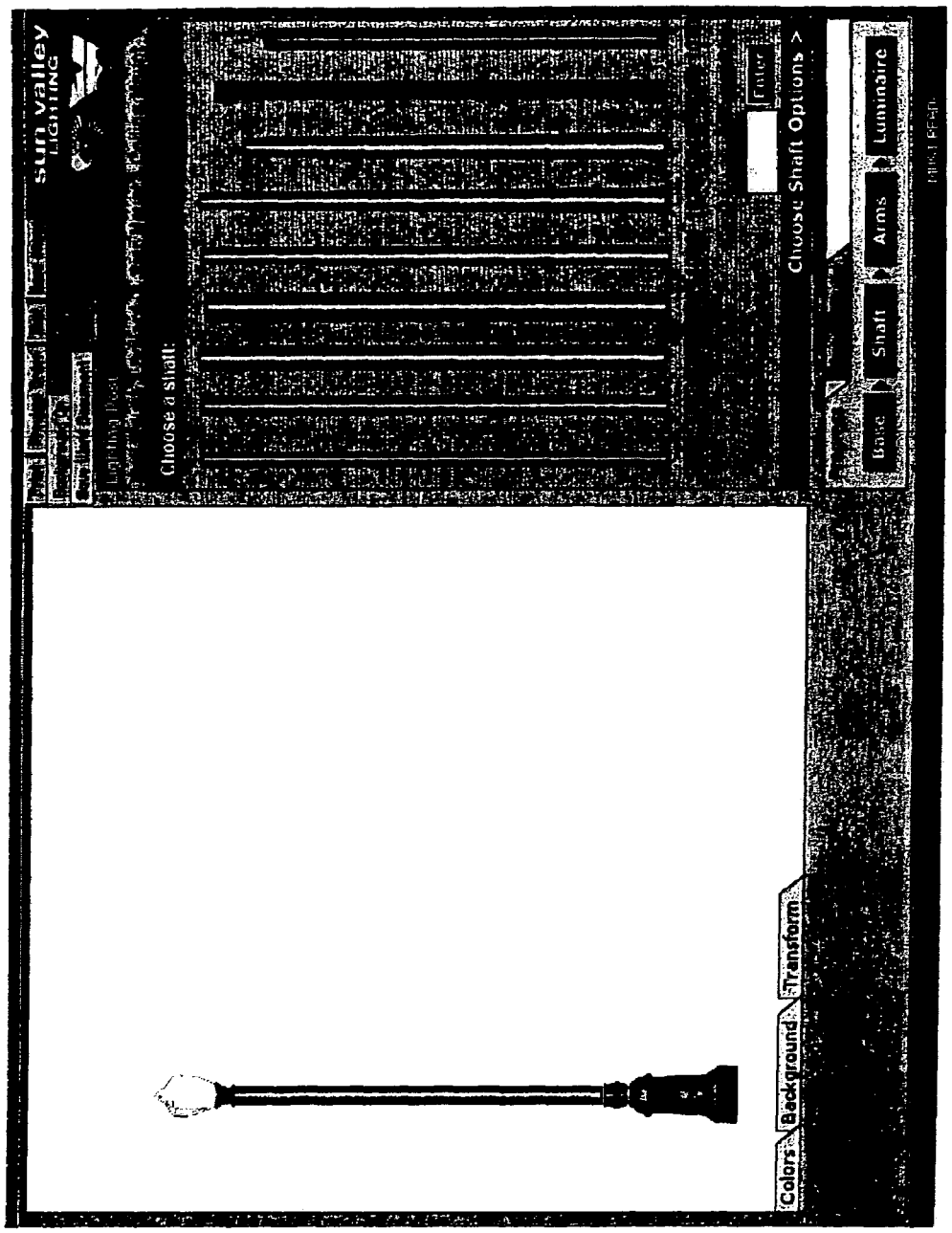
FIG. 16 shows an on-screen display illustrating operator selection of the system's lighting post shaft options of FIG. 5.
Figure 17:
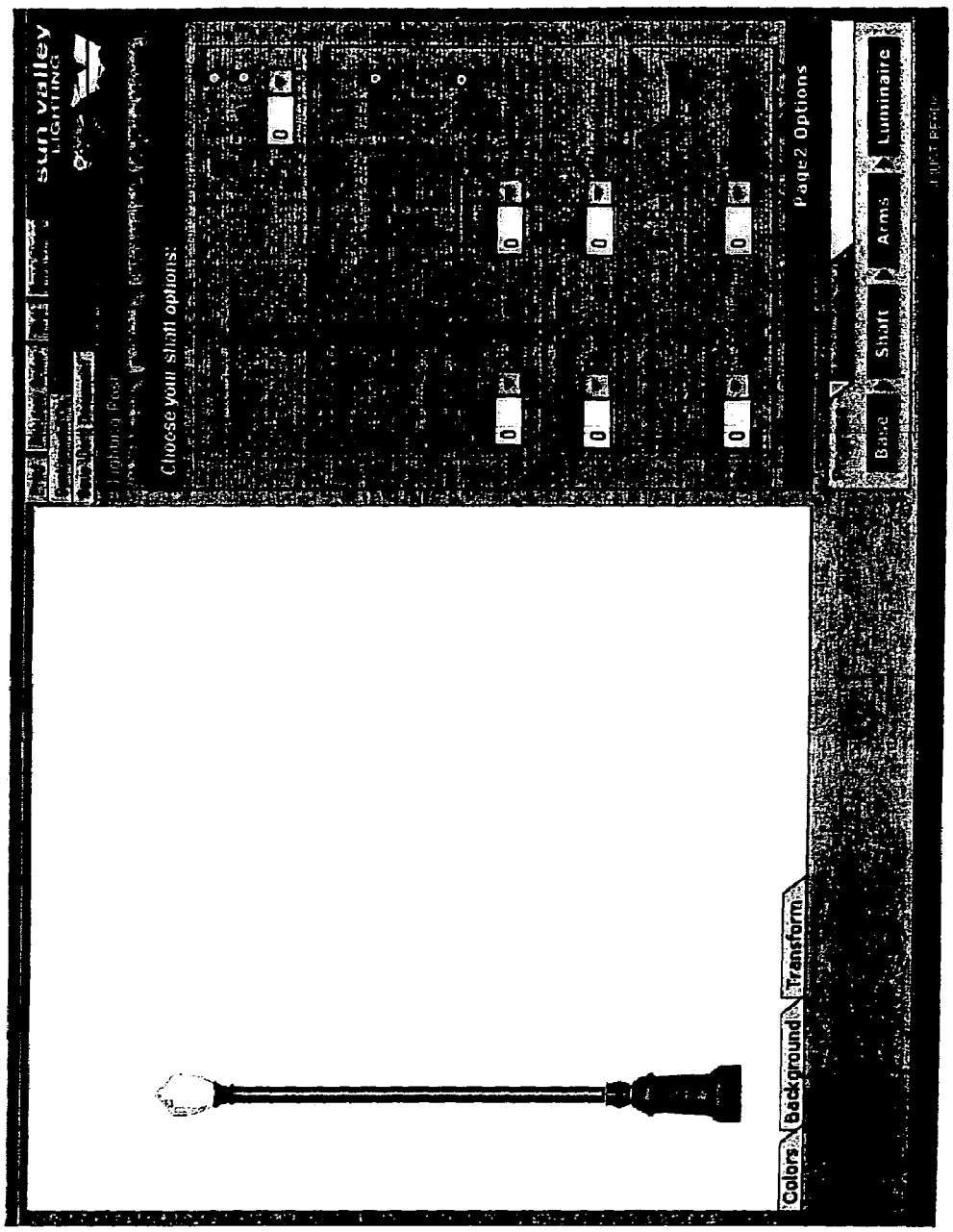
FIG. 17 shows an on-screen display illustrating another aspect of operator selection of the system's lighting post shaft options of FIG. 5.
Figure 18:
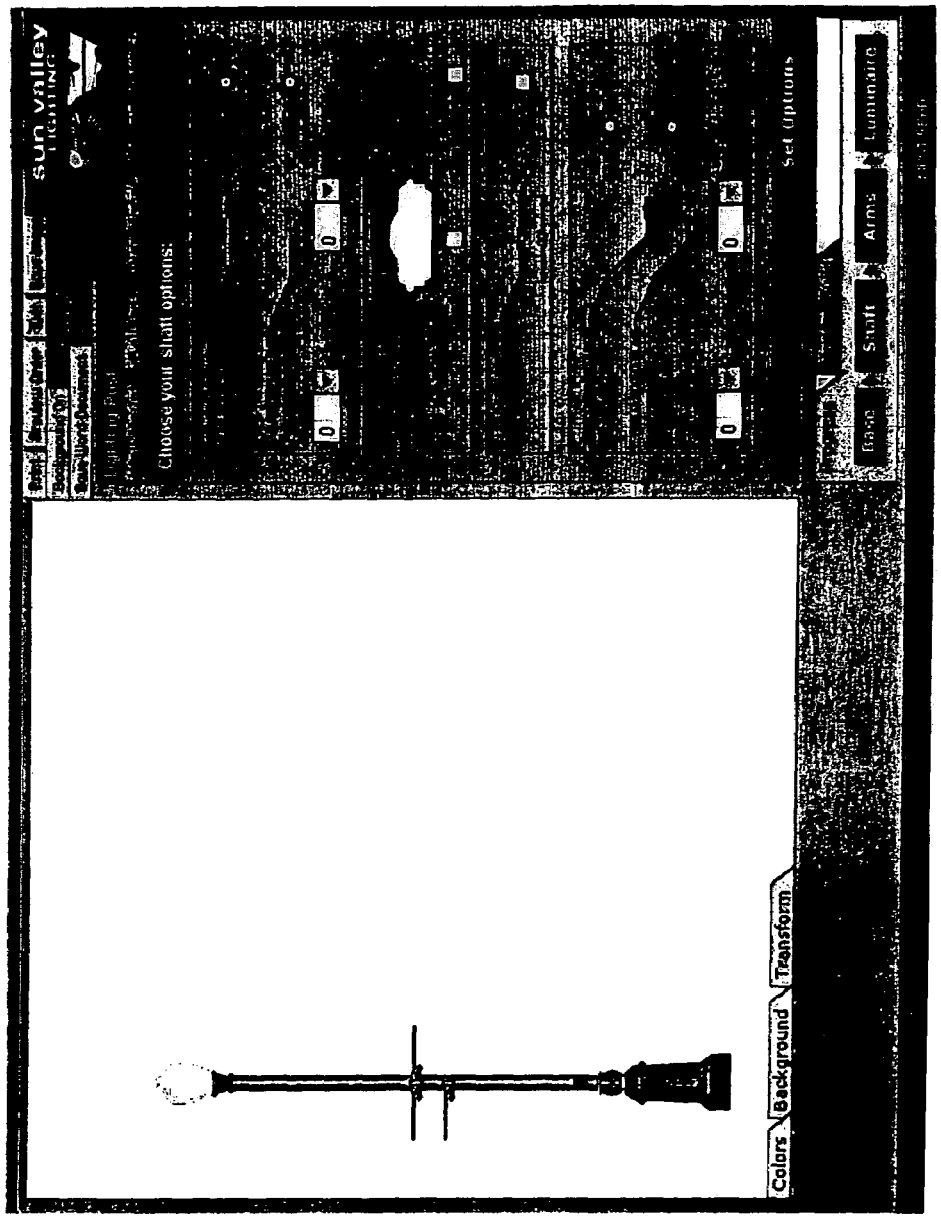
FIG. 18 shows an on-screen display illustrating another aspect of operator selection of the system's lighting post shaft options of FIG. 5.

Referring back to FIG. 2, the flow diagram shows steps for selecting a lighting post luminaire. The "choose a base" display 202 allows for selecting a base design for the luminaire. A possible set of base designs and an according user interface and display are shown in FIG. 15.

Figure 19:
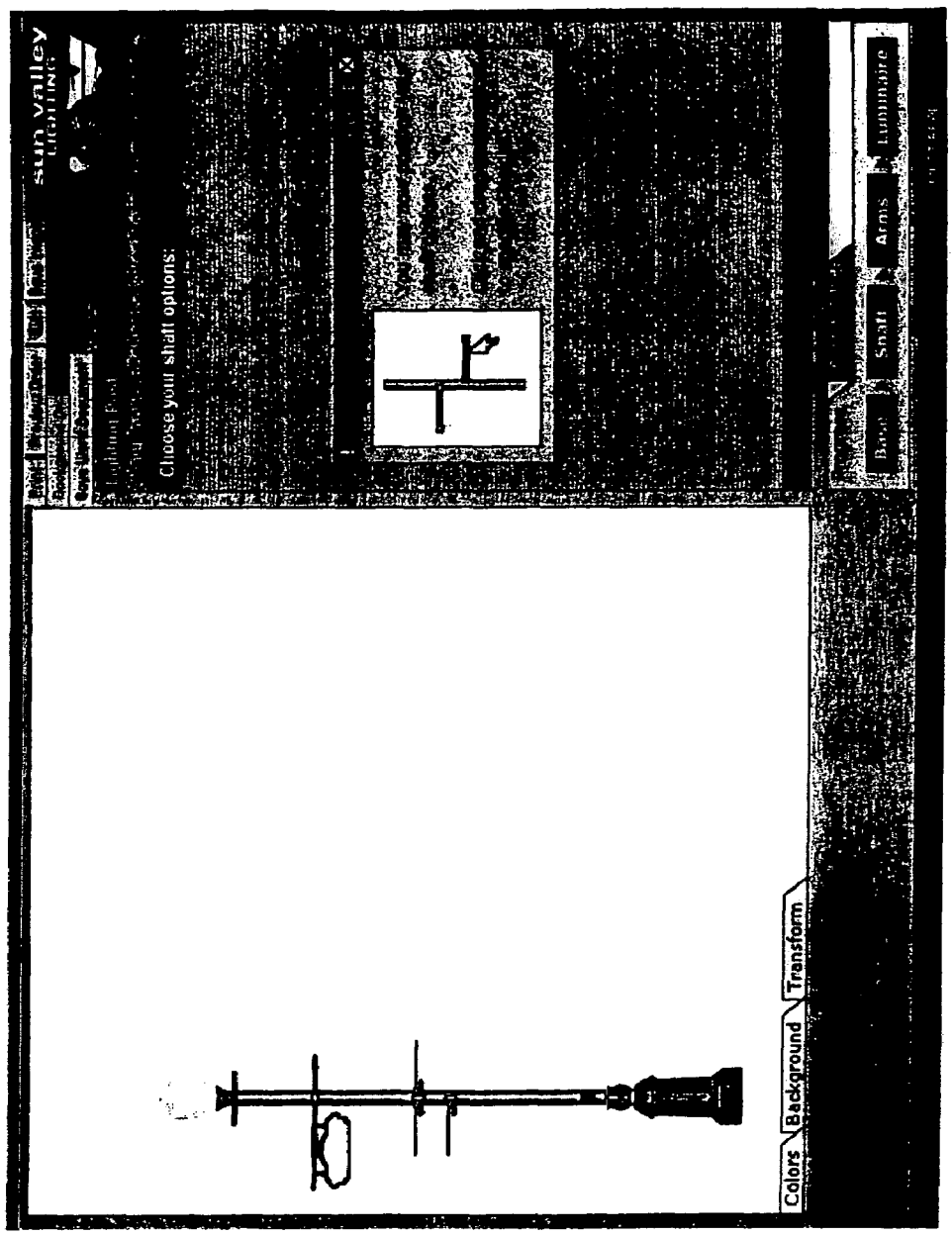
FIG. 19 shows an on-screen display illustrating another aspect of operator selection of the system's lighting post shaft option of FIG. 5.

Similarly "chose a shaft" display 204 allows for selecting a shaft. A possible set of shaft designs and an according user interface and display are shows in FIG. 16. Note that the "choose a shaft" display of the embodiment shown in FIG. 2 leads to an "execute shaft options" subsection 206 to handle complex shafts. The details of the "execute shaft options" subsection 206 are shown in the flow diagram of FIG. 5. "Display shaft options" 502 of FIG. 5 allows for an initial selection of complex shaft options, as shown in the possible set of options and an according user interface and display shown in FIG. 17. Then, a further step of "display shaft options" 504 allows for further complexity, as shown in the possible set of options and an according user interface and display shown in FIG. 18. Finally, selected shaft attachments may be height-adjusted 506, a possible user interface and display is shown in FIG. 19.

Figure 20:
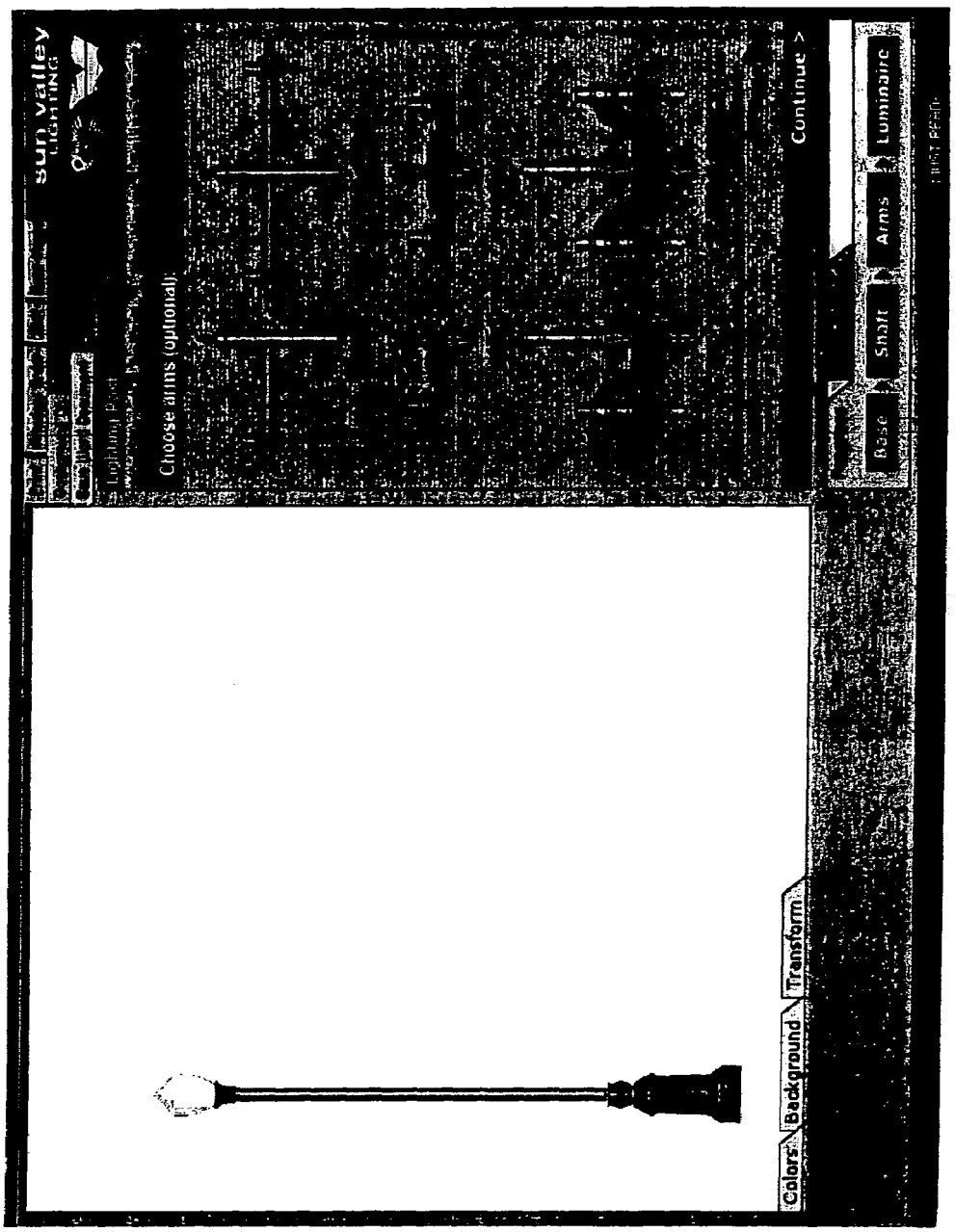
FIG. 20 shows an on-screen display illustrating operator selection of the system's arms options of FIG. 6.
Figure 21:
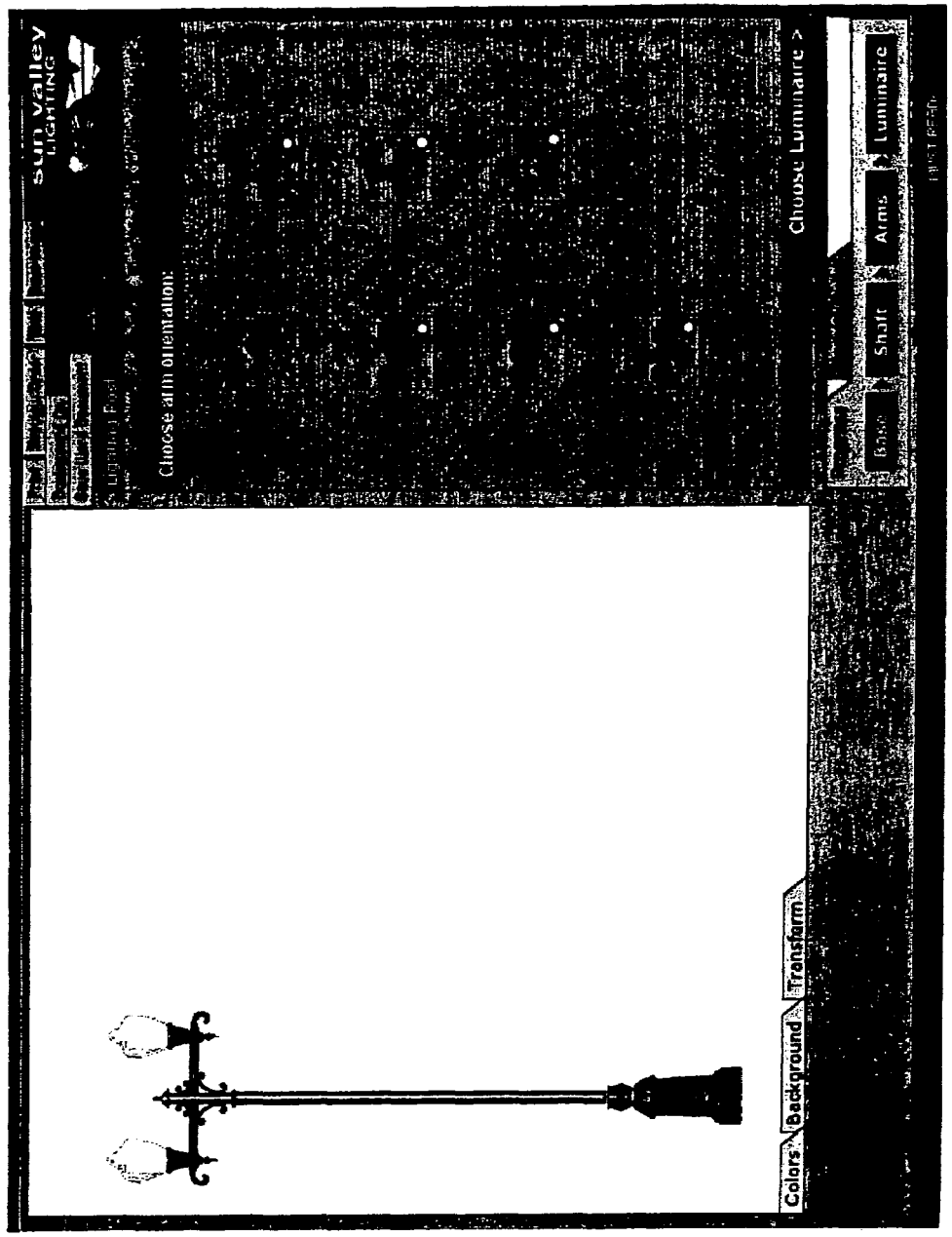
FIG. 21 shows an on-screen display illustrating operator selection of the system's arm orientation of FIG. 6.

The "choose arms" display 208 in FIG. 2 allows for selecting arms. A possible set of arm designs and an according user interface and display are shown in FIG. 20. Again, to handle complexity, FIG. 2 shows an "execute arms" subsection 210, which is shown in detail in FIG. 6. The step of selecting an arm design, as shown in FIG. 20, is represented by the step "display arm icons" 602 in FIG. 6. Then, the "choose arms orientation" display step 604 allows for selection of orientation of the selected arm or arms. FIG. 21 shows a possible interface and display for selecting orientations.

Figure 22:
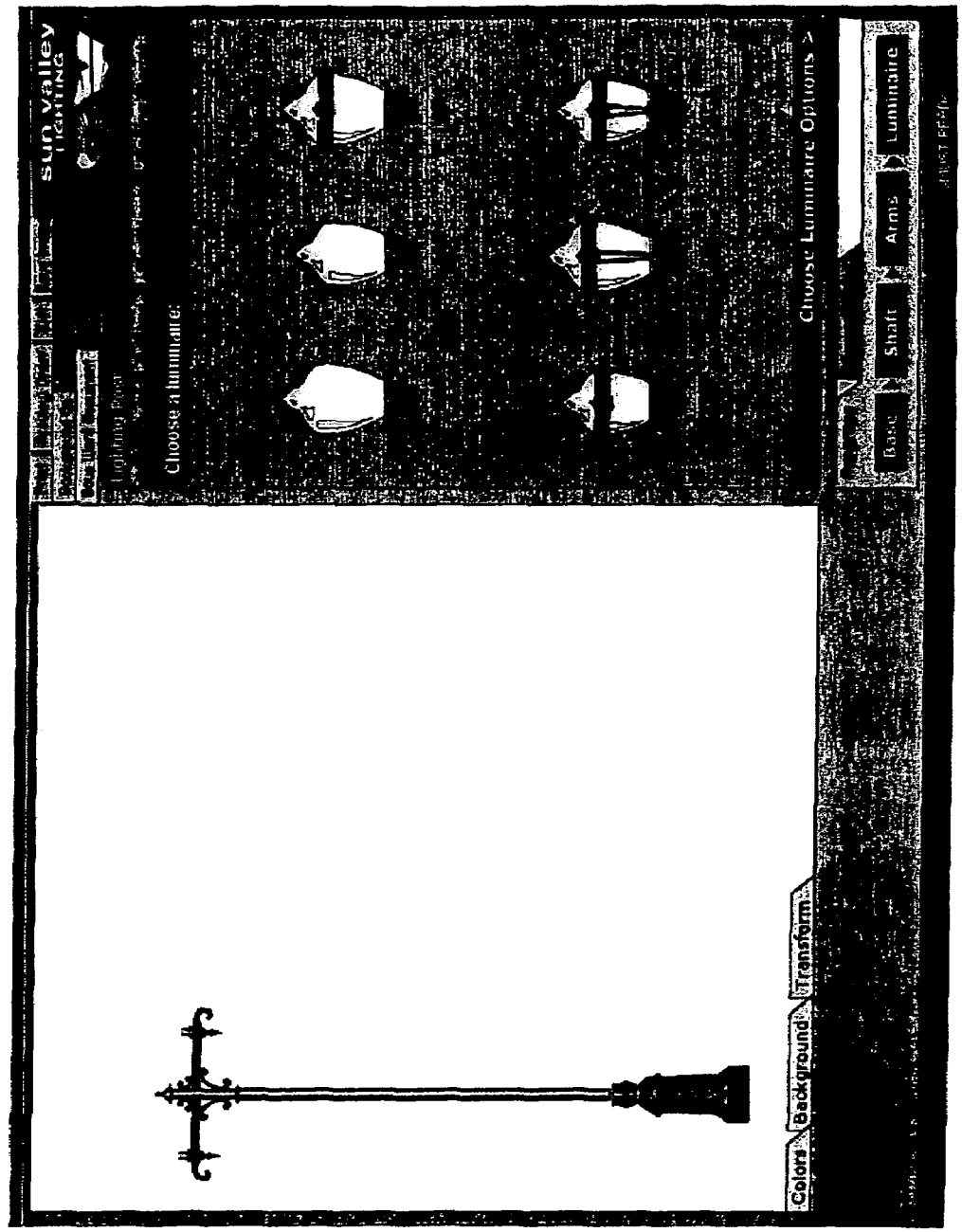
FIG. 22 shows an on-screen display illustrating operator selection of the system's luminaire selection of FIG. 2.
Figure 23:
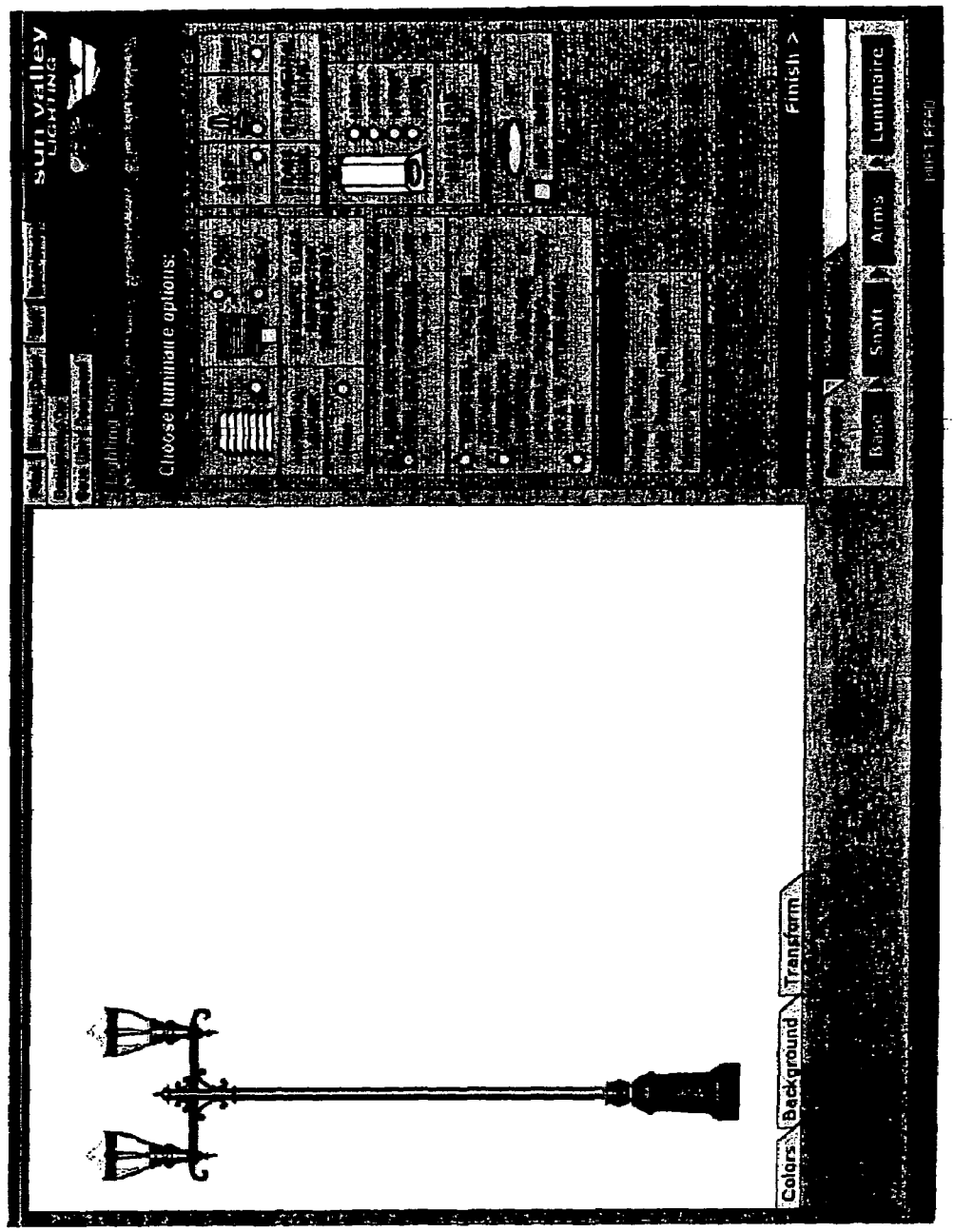
FIG. 23 shows an on-screen display illustrating operator selection of the system's luminaire options selection of FIG. 2.

The "choose a luminaire" display 212 of FIG. 2 targets selection of the luminaire or lighting portion (the lamp) of the luminaire. FIG. 22 shows a possible set of luminaire portion designs and an according user interface and display. The step of choosing the luminaire portion includes selection of luminaire options 214, a possible set of options with an according user interface and display is shown in FIG. 23.

Figure 24:
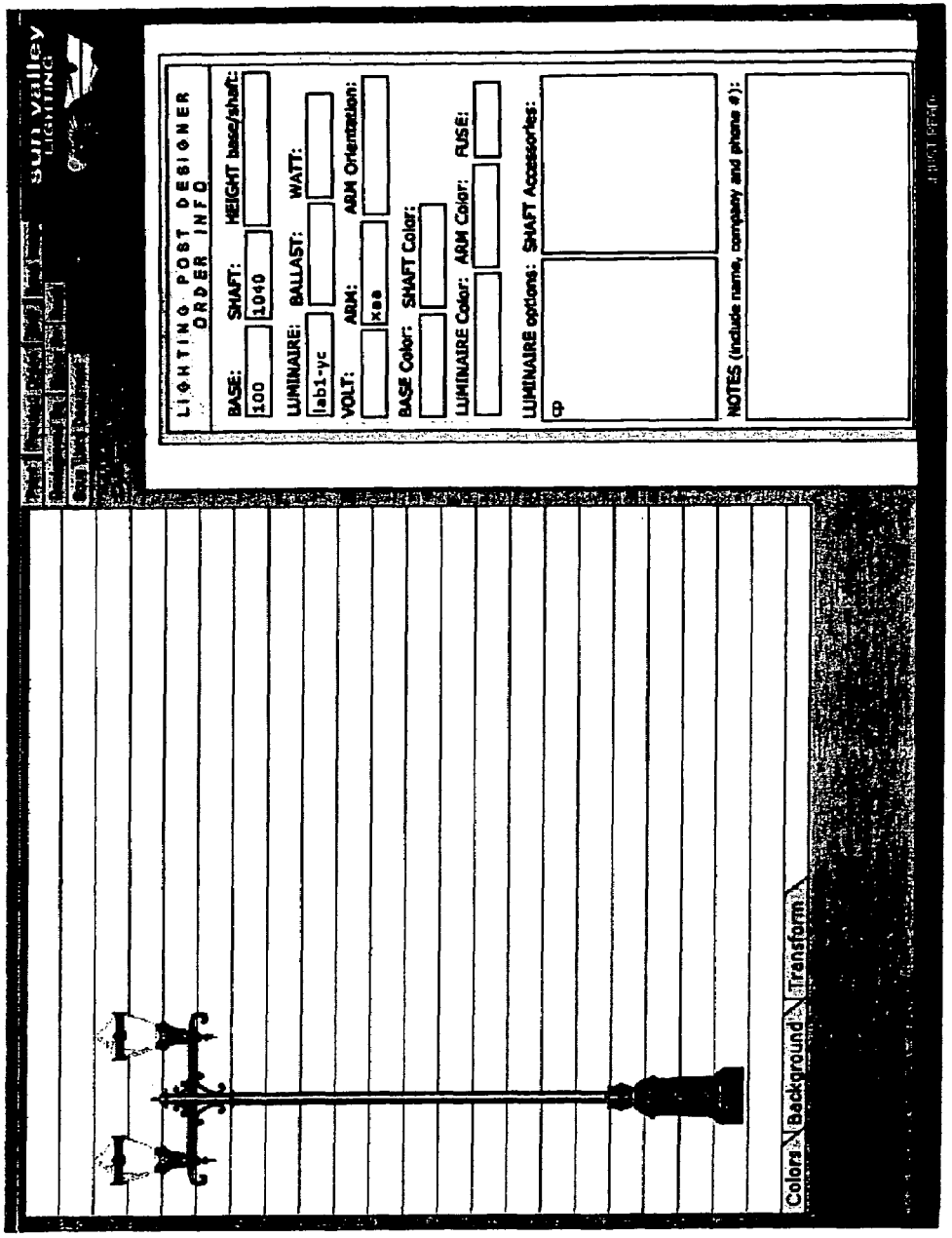
FIG. 24 shows an on-screen display illustrating operator selection of the system's order information of FIG. 2.

Once the complete lighting post luminaire is selected, the embodiment of FIG. 2 allows for selection of a number of global options including display of order information 216. One such possible display is shown in FIG. 24.

Figure 25:
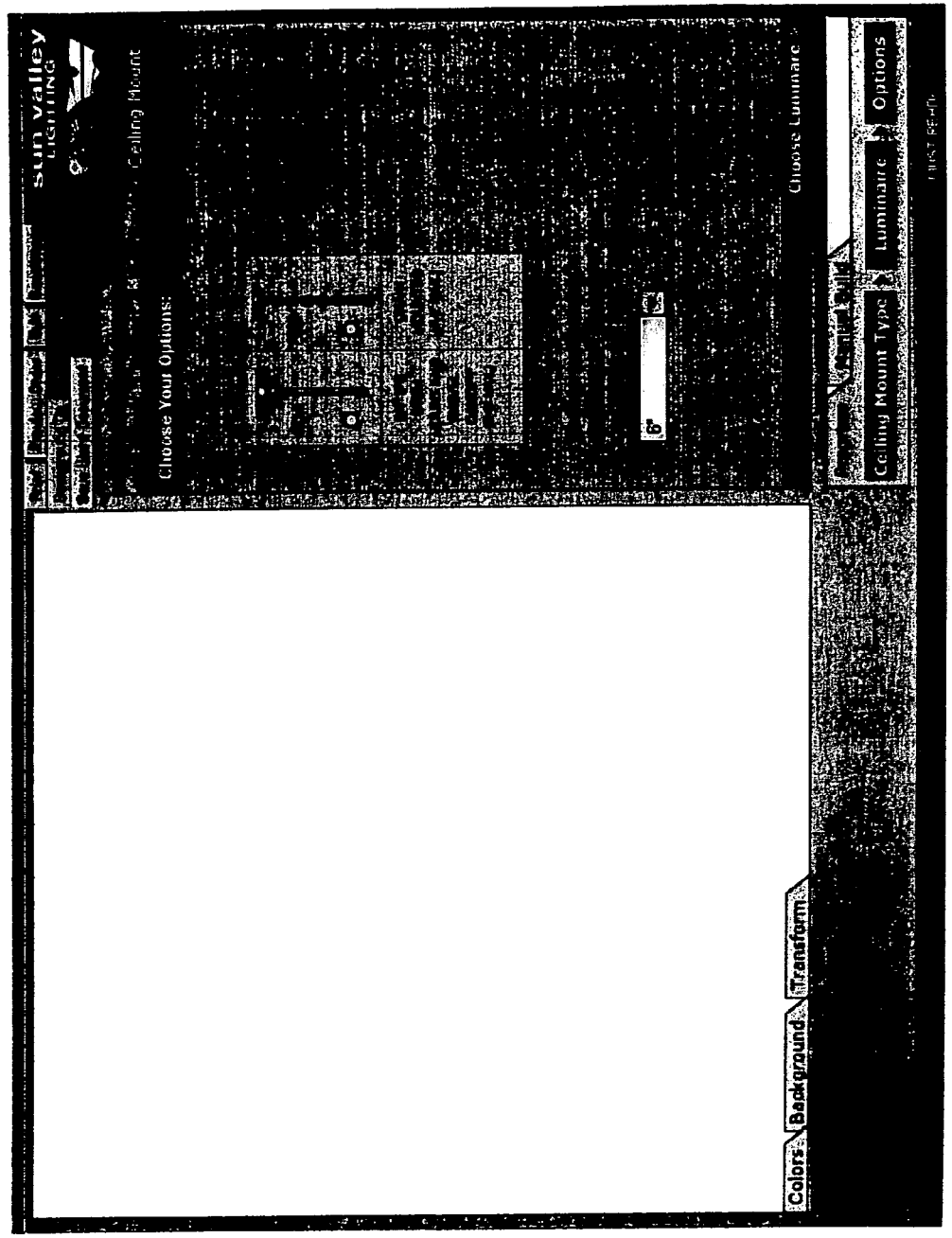
FIG. 25 shows an on-screen display illustrating operator selection of the system's ceiling mount options of FIG. 3.
Figure 26:
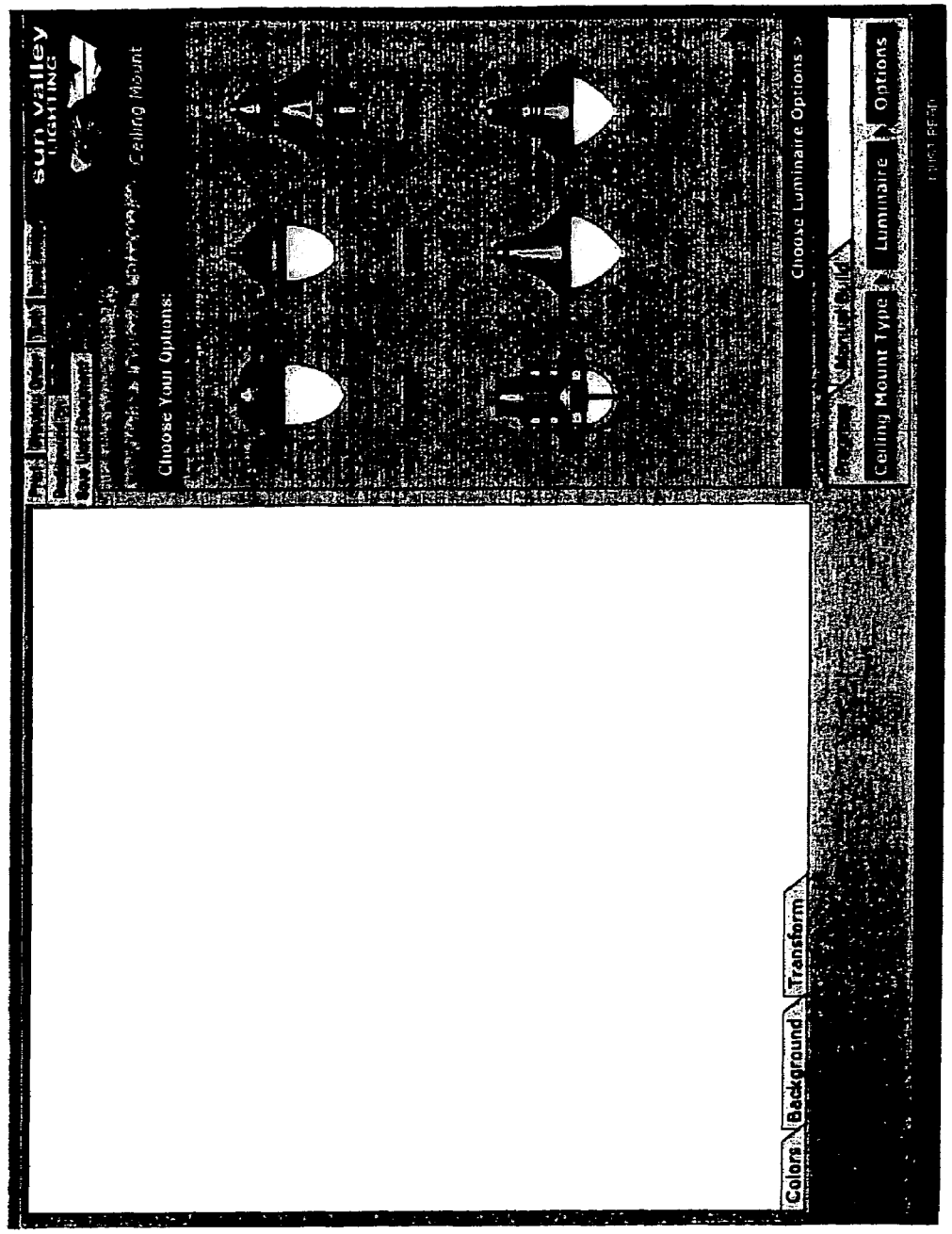
FIG. 26 shows an on-screen display illustrating another aspect of operator selection of the system's ceiling mount selection of FIG. 3.
Figure 27:
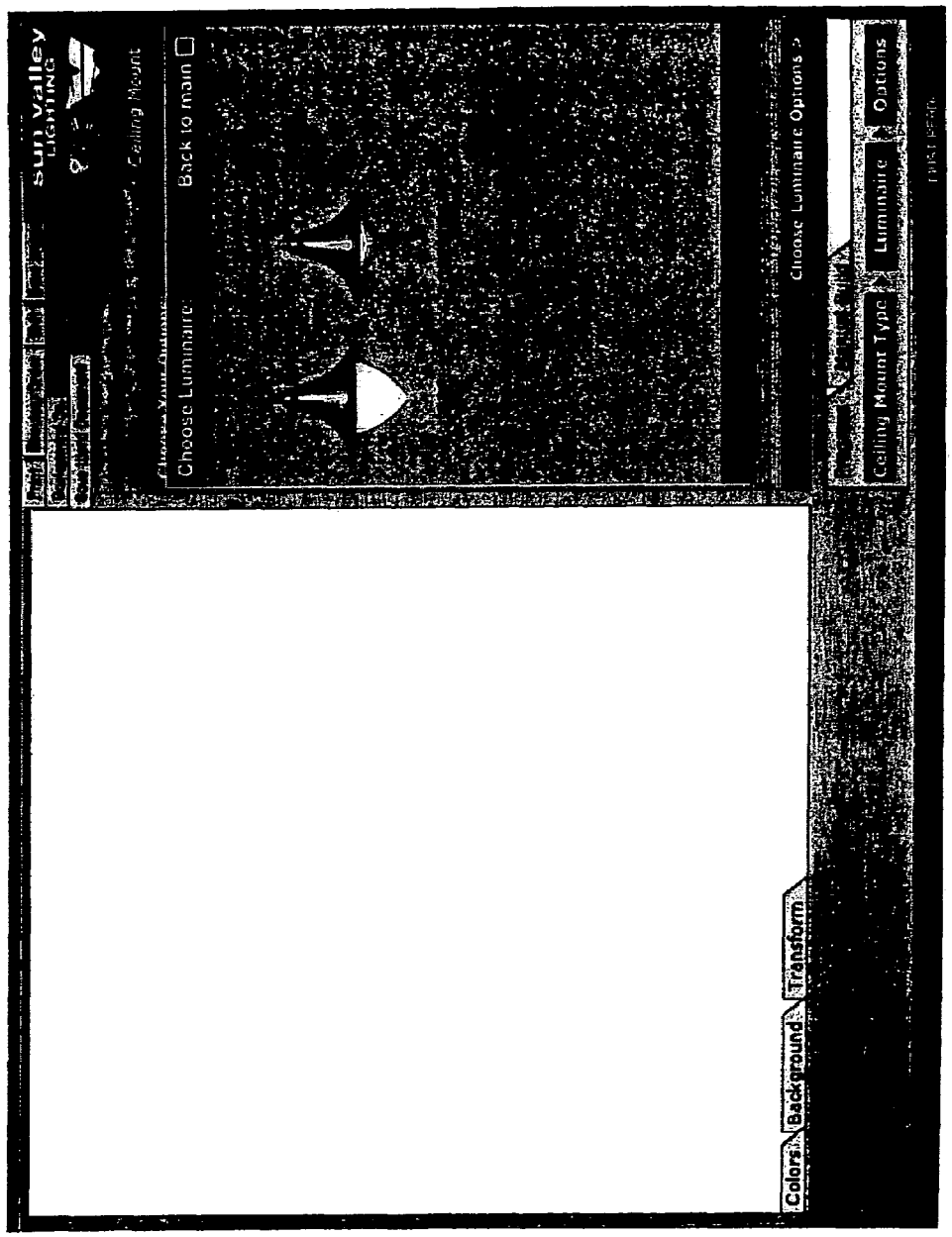
FIG. 27 shows an on-screen display illustrating another aspect of operator selection of the system's luminaire selection of FIG. 3.
Figure 28:
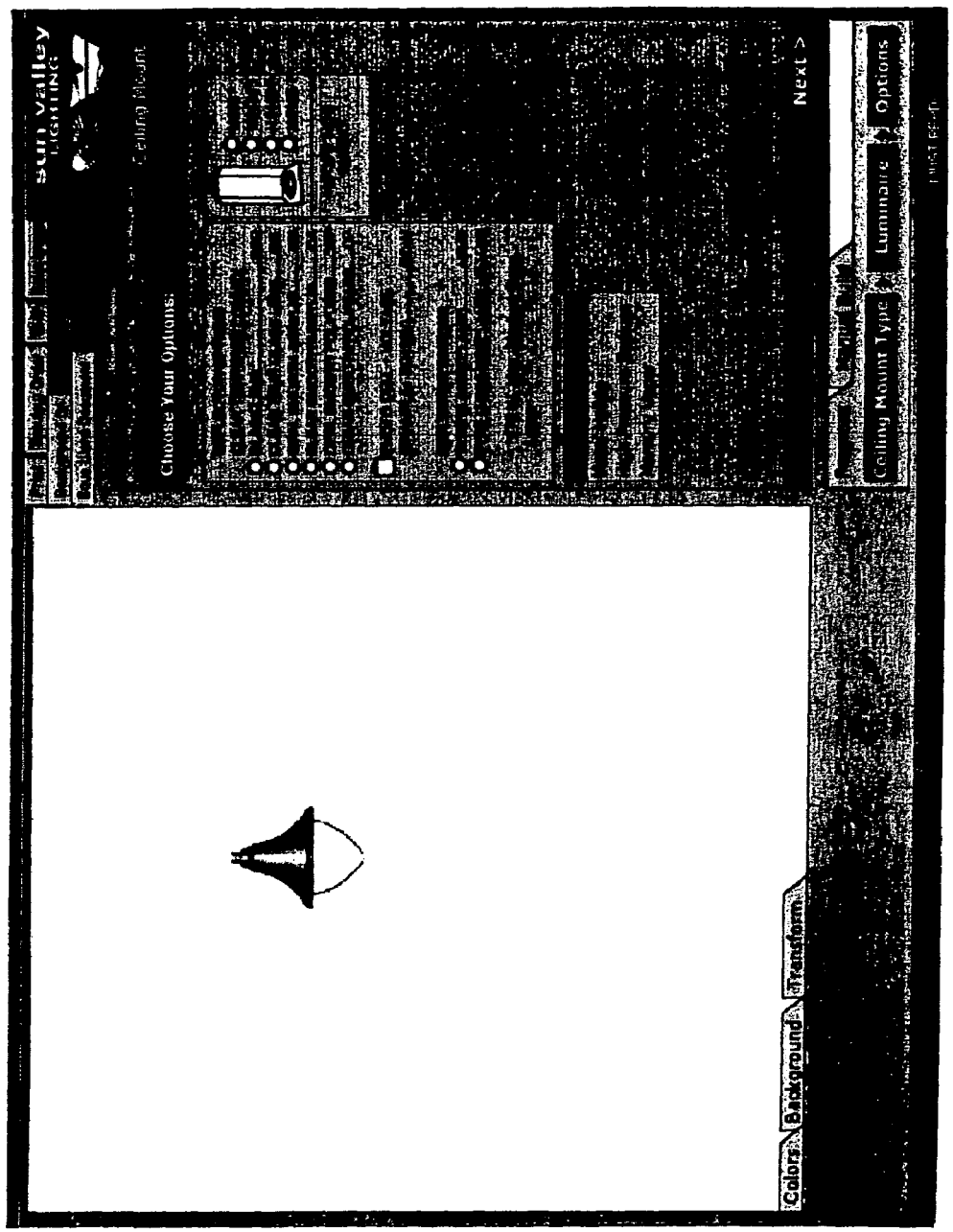
FIG. 28 shows an on-screen display illustrating operator selection of the system's ceiling mount luminaire options of FIG. 3.

Referring back to FIG. 3, the flow diagram shows steps for selecting a ceiling mount luminaire. A possible set of options for the ceiling mount portion of the ceiling mount luminaire and an according user interface and display representing the "choose your options" display 302 of FIG. 3 is shown in FIG. 25. A possible set of options for the luminaire portion of the ceiling mount luminaire and an according user interface and display representing the "choose your options" display 304 of FIG. 3 is shown in FIG. 26. Once the luminaire portion of the ceiling mount luminaire is selected, a luminaire submenu 306 may be utilized to further refine the luminaire portion of the ceiling mount, a possible set of options and an according user interface and display is shown in FIG. 27. Finally, further options may be available regarding the lighting portion of the ceiling mount luminaire, as provided in step 308 of FIG. 3, a possible according display and user interface is shown in FIG. 28.

Figure 29:
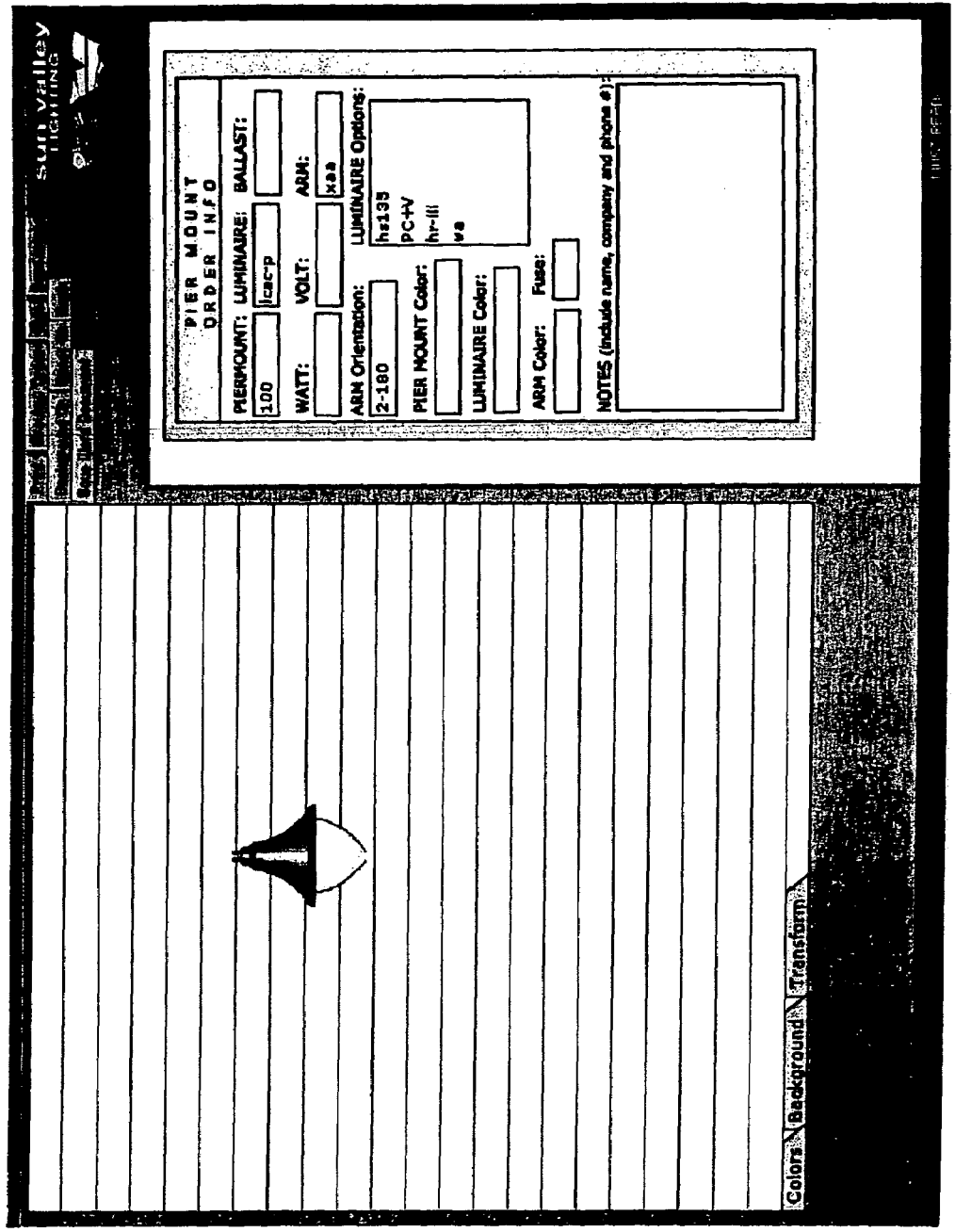
FIG. 29 shows an on-screen display illustrating operator selection of the system's order information of FIG. 3.

Once the complete ceiling mount luminaire is selected, the embodiment of FIG. 3 allows for selection of a number of global options including display of order information 310. One such possible display is shown in FIG. 29.

Figure 30:
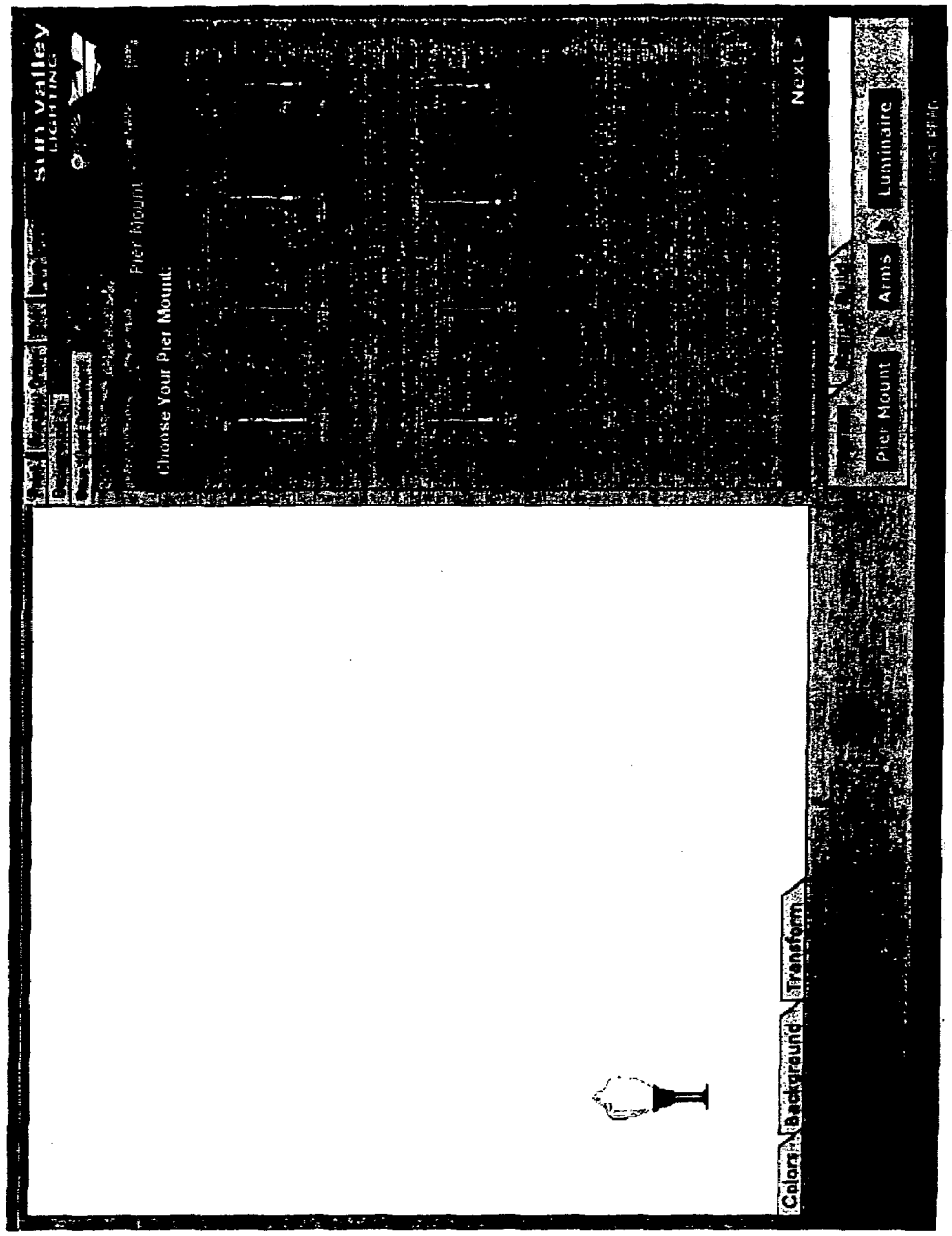
FIG. 30 shows an on-screen display illustrating operator selection of the system's pier mount selection of FIG. 4.
Figure 31:
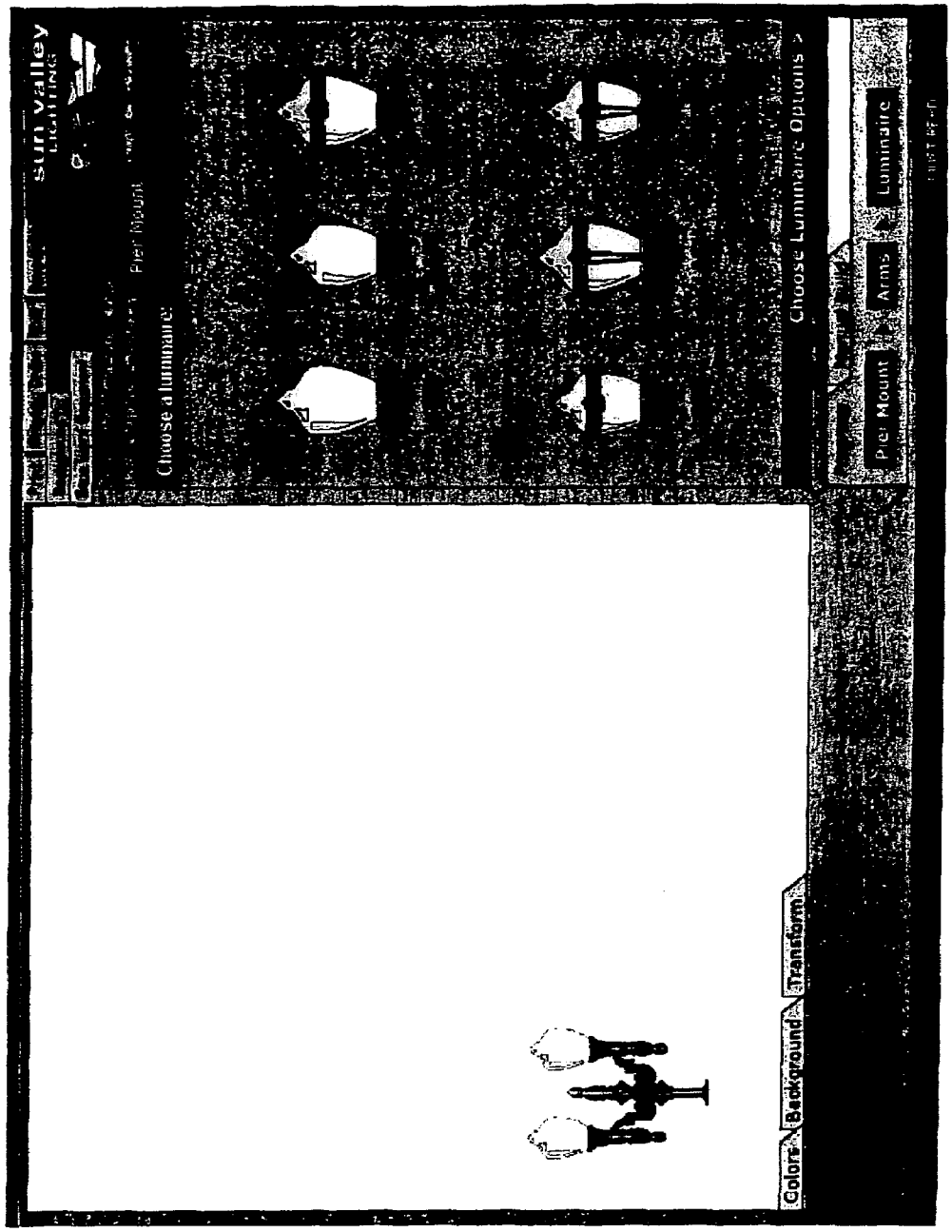
FIG. 31 shows an on-screen display illustrating operator selection of the system's luminaire selection of FIG. 4.
Figure 32:
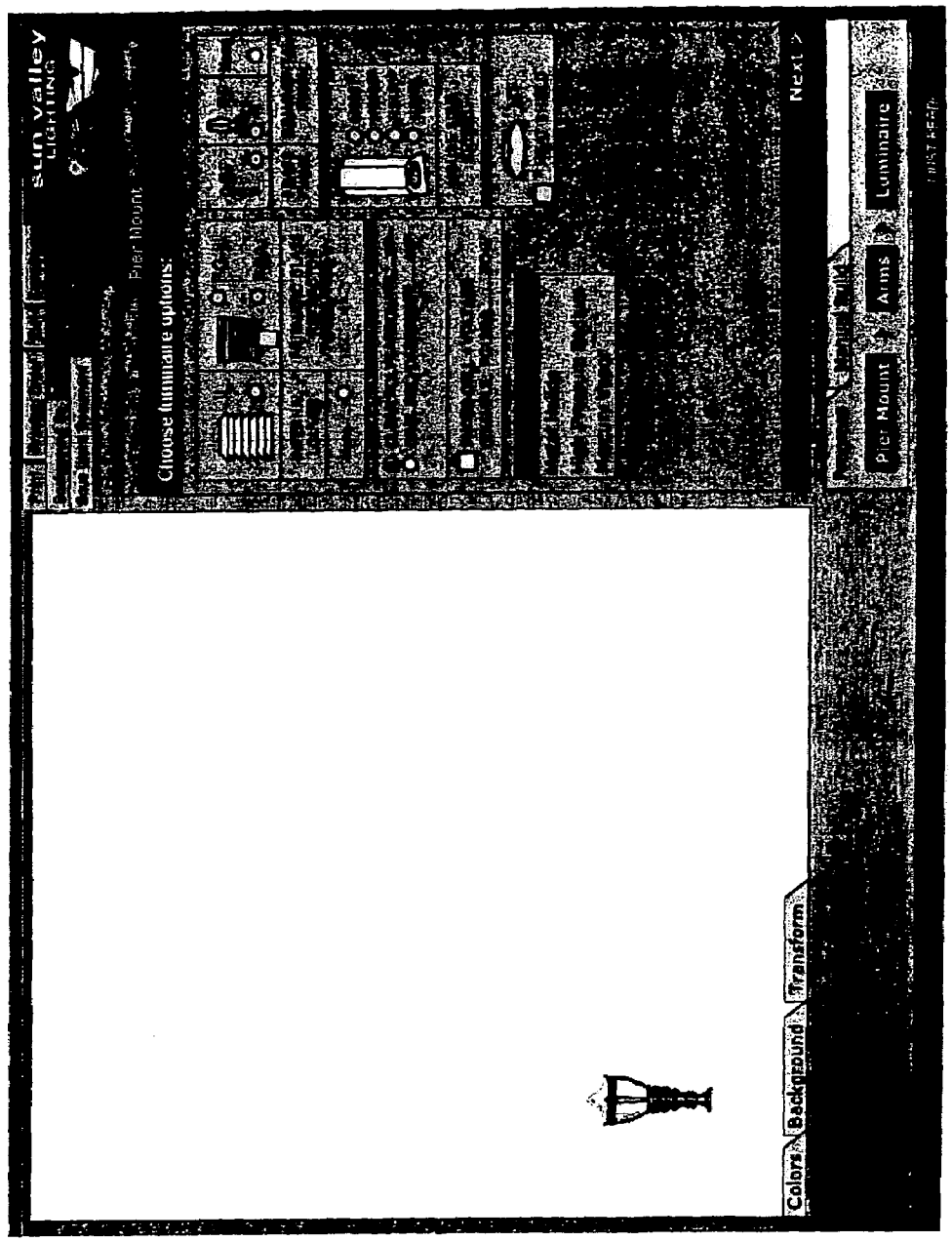
FIG. 32 shows an on-screen display illustrating operator selection of the system's luminaire options selection of FIG. 4.

Referring back to FIG. 4, the flow diagram shows steps for selecting a pier mount luminaire. As a first step the pier mount portion of the pier mount luminaire is selected and displayed as shown by the "chose pier mount" display step 402. A possible set of designs for the pier mount portion and an according user interface and display are shown in FIG. 30. Then, similarly to the lighting post luminaire flow diagram of FIG. 2, FIG. 4 shows the steps of choosing arms 404, including an "execute arms" subsection 406 referring to the flow diagram of FIG. 6 already described above in the context of selecting arms for the lighting post luminaire. Finally, the luminaire portion of the pier mount luminaire is chosen, as indicated by the "choose a luminaire" display 408. A possible selection of luminaire portions including an according interface and display is shown in FIG. 31. Again, selection of a luminaire portion includes selection of luminaire options as indicated in the step "user selects luminaire options" 410 of the flow diagram in FIG. 4. A possible selection of options including an according interface and display is shown in FIG. 32.

Figure 33:
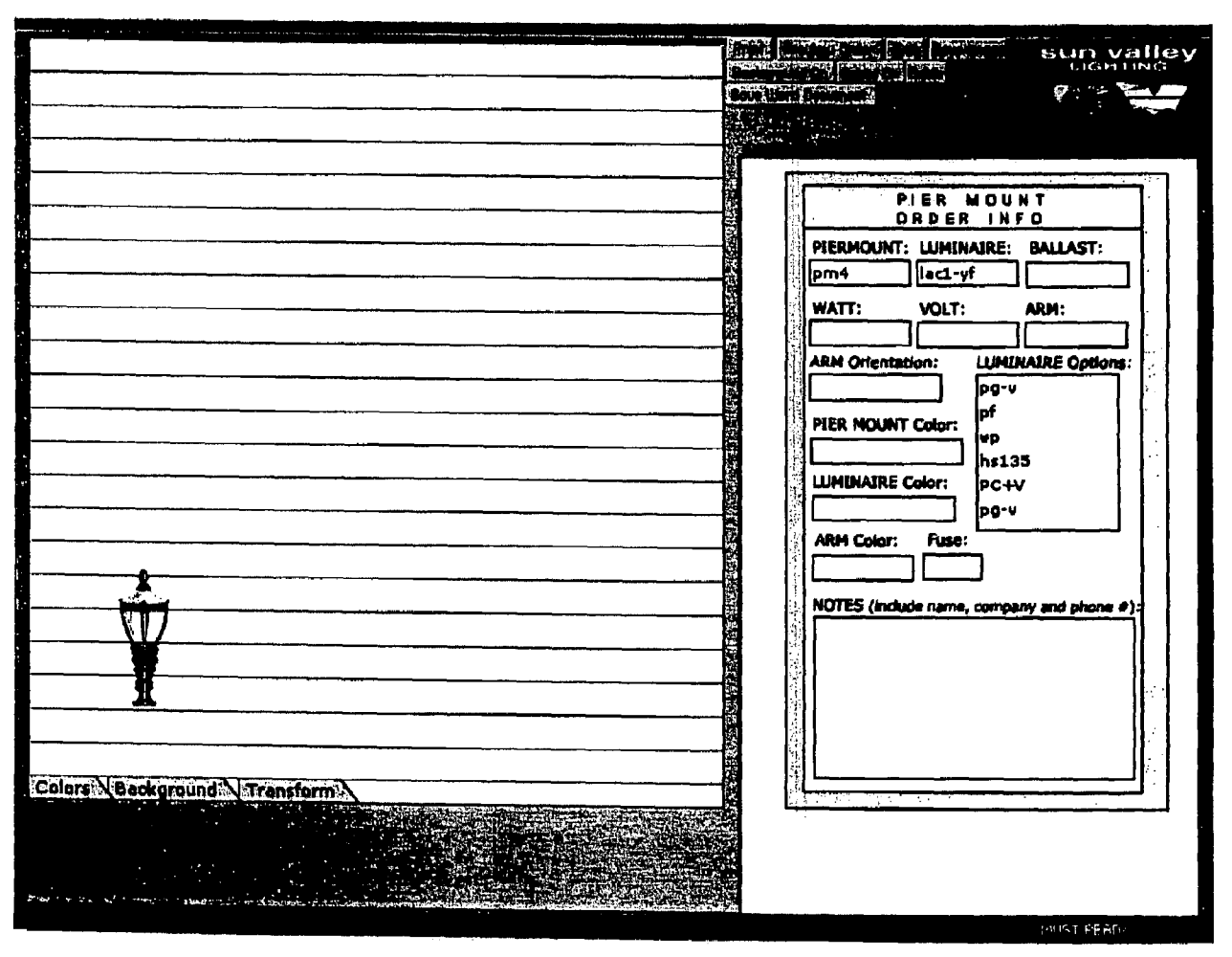

Once the complete pier mount luminaire is selected, the embodiment of FIG. 4 allows for selection of a number of global options including display of order information 412. One such possible display is shown in FIG. 33.

Figure 34:
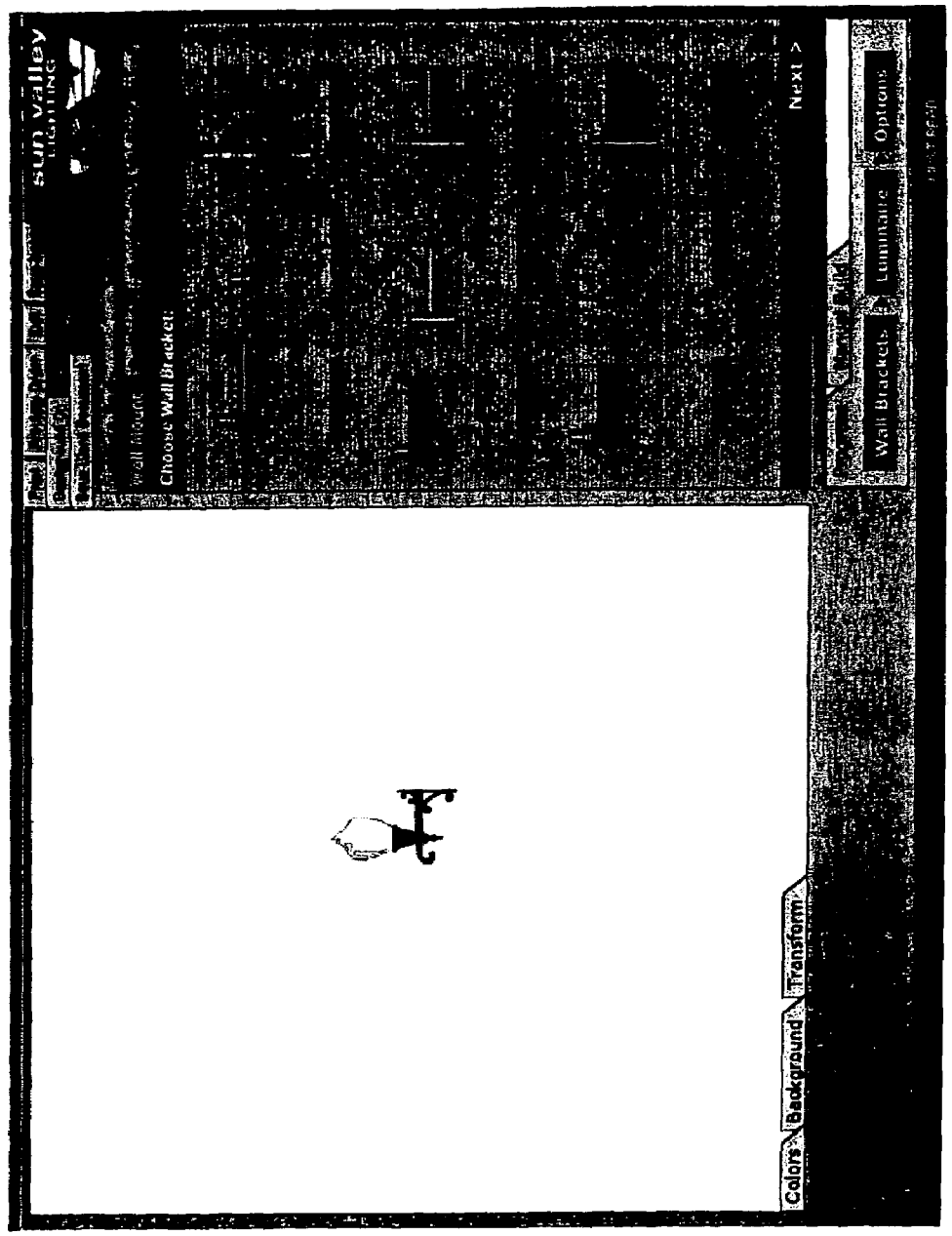
FIG. 34 shows an on-screen display illustrating operator selection of the system's wall bracket selection of FIG. 8.
Figure 35:
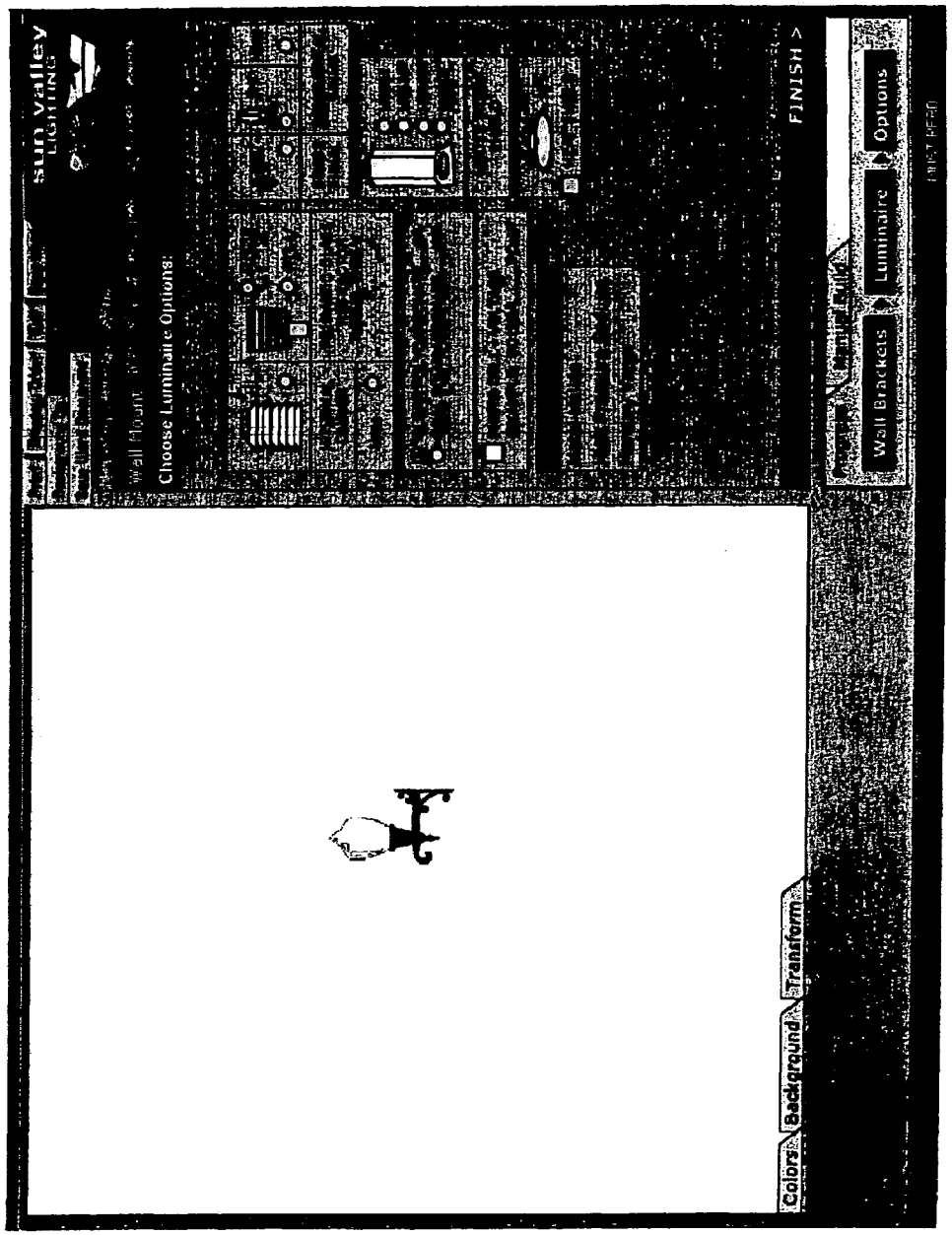
FIG. 35 shows an on-screen display illustrating operator selection of the system's luminaire options of FIG. 8.

Referring back to FIG. 8, the flow diagram shows steps for selection a wall mount luminaire. First, a wall bracket is selected, as indicated by the "choose wall bracket" display 802. A possible set of designs of wall brackets and an according interface and display are shown in FIG. 34. Then, the luminaire portion of the wall mount luminaire is selected, beginning at the "choose luminaire" display step 804. As before, such selection includes selection of luminaire options 806. A possible set of options and an according user interface and display is shown in FIG. 35.

Figure 36:
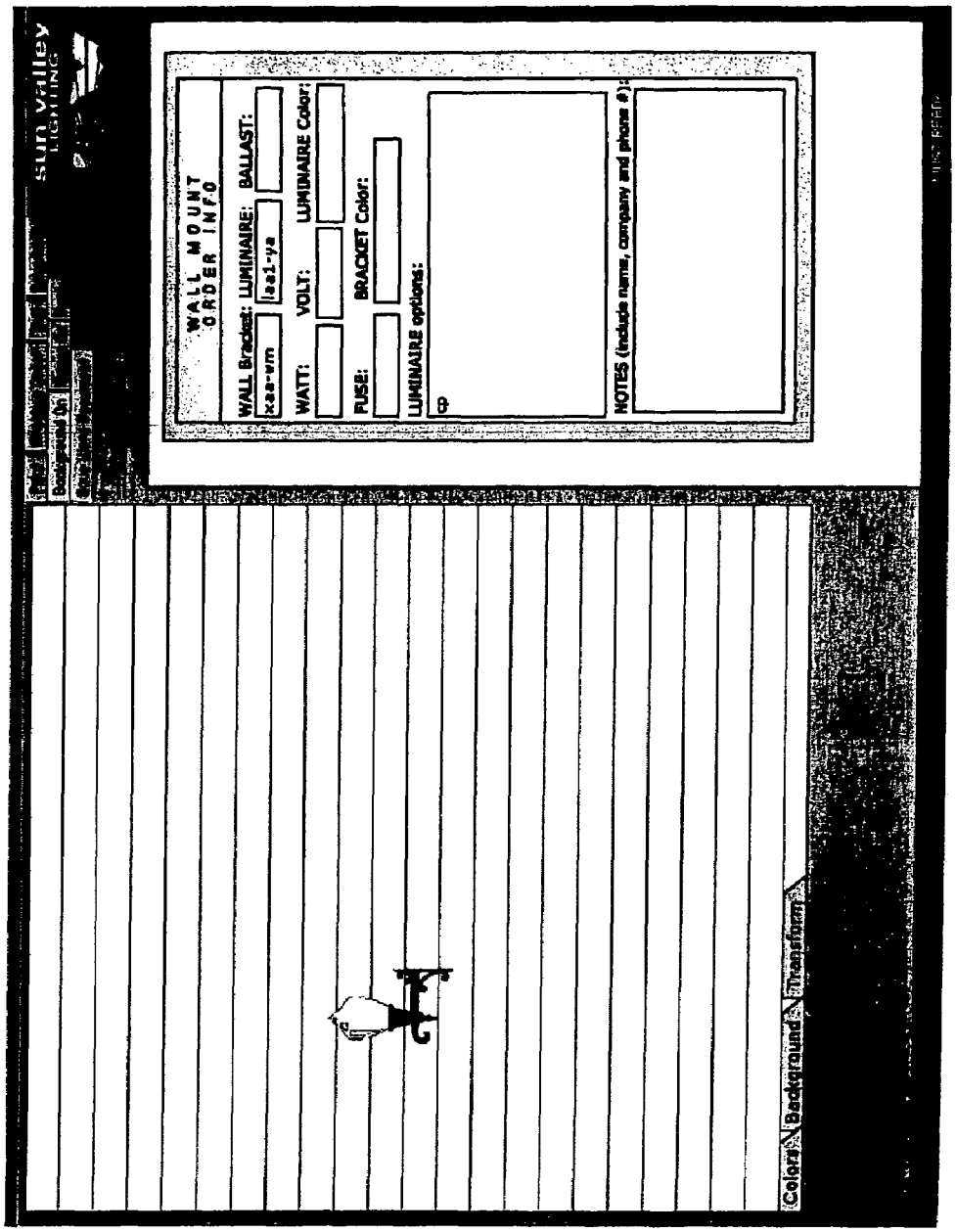
FIG. 36 shows an on-screen display illustrating operator selection of the system's order information of FIG. 8.

Once the complete wall mount luminaire is selected, the embodiment of FIG. 8 allows for selection of a number of global options including display of order information 808. One such possible display is shown in FIG. 36.

Figure 37:
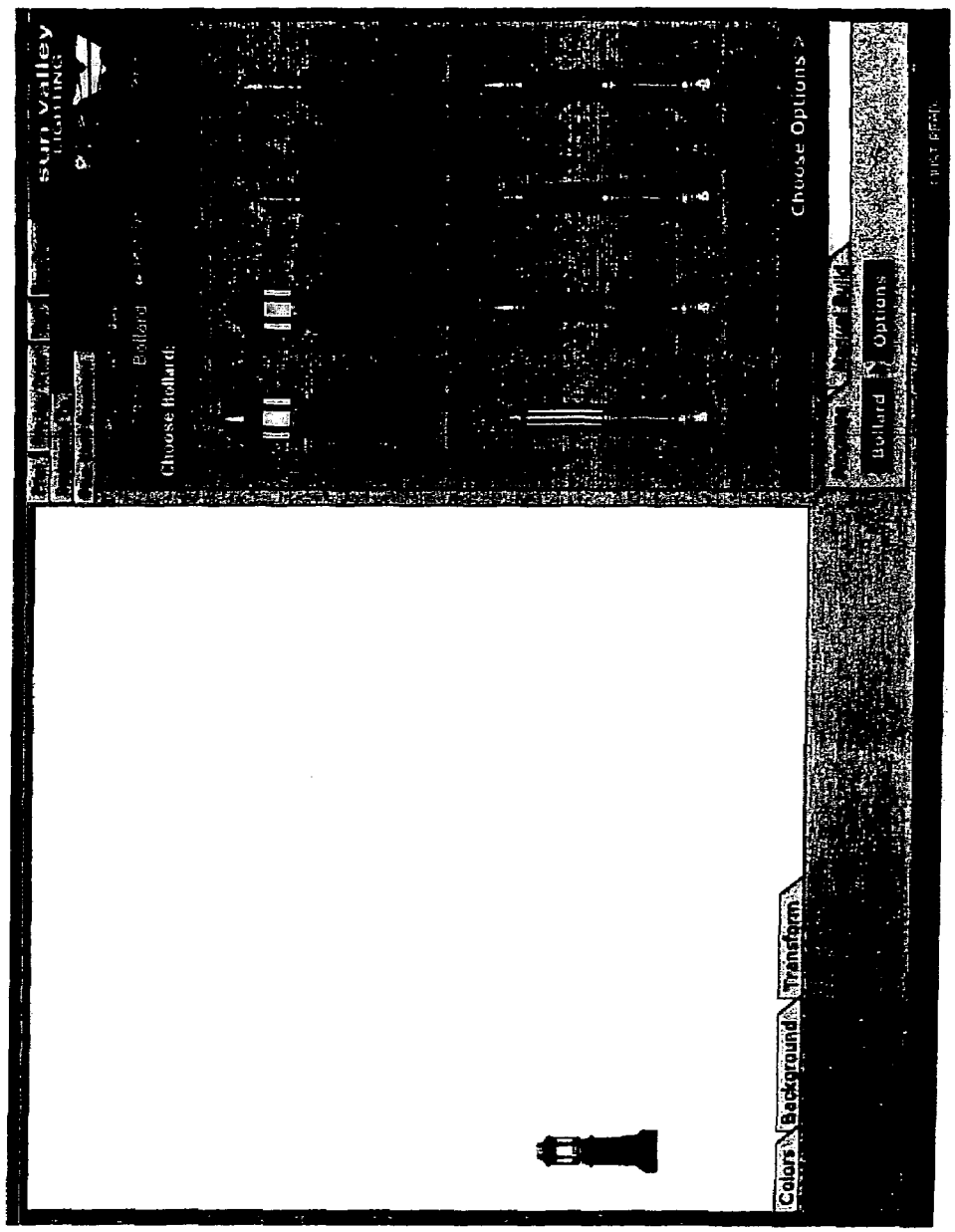
FIG. 37 shows an on-screen display illustrating operator selection of the system's bollard selection of FIG. 9.
Figure 38:
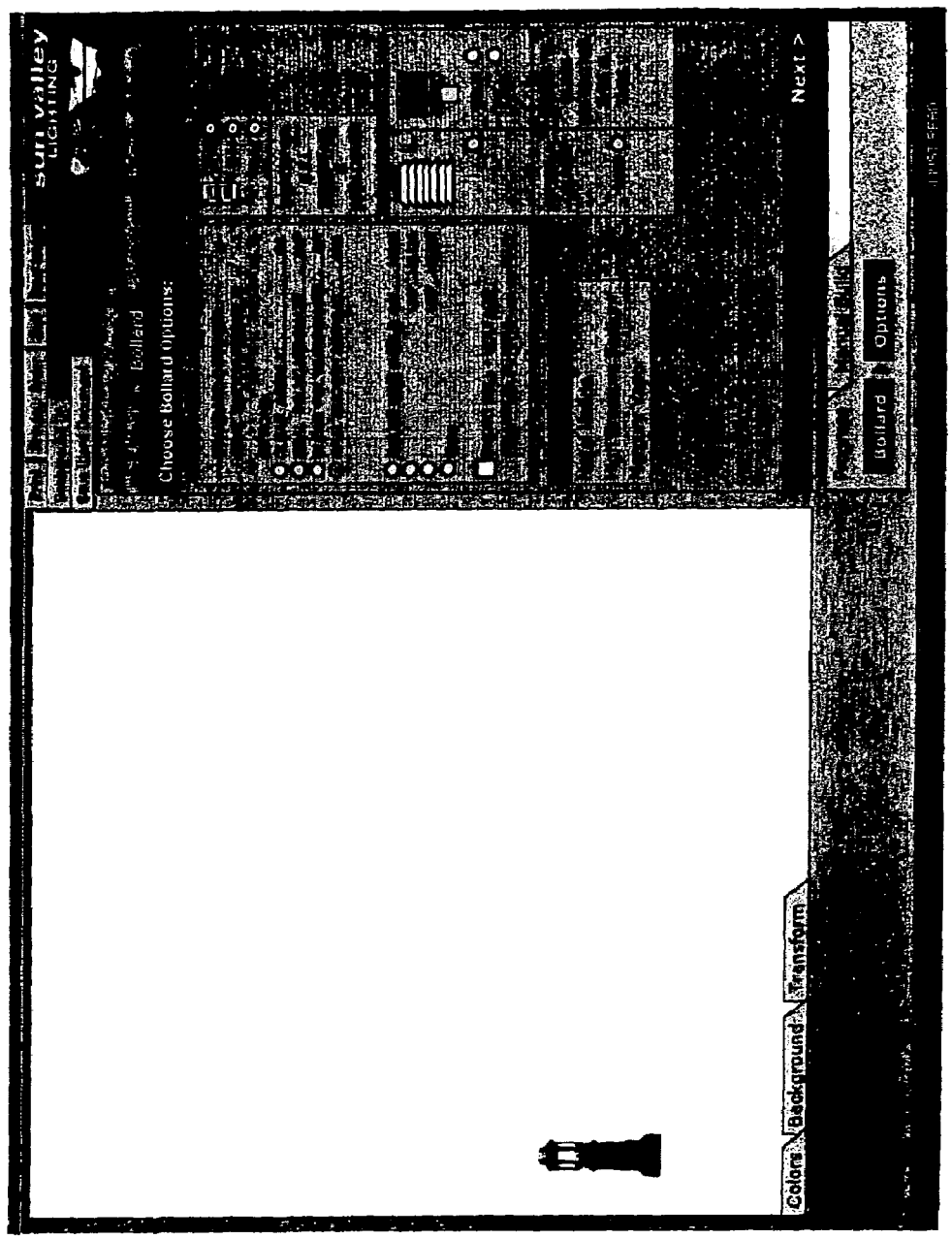
FIG. 38 shows an on-screen display illustrating operator selection of the system's bollard options selection of FIG. 9.

Referring back to FIG. 9, the flow diagram shows steps for selecting a bollard luminaire. In this particular embodiment, selecting the bollard 902 is the main step of the process. A possible set of designs and an according interface and display are shown in FIG. 37. Choosing a bollard is followed by selecting bollard options 904. A possible set of options and an according interface and display is shown in FIG. 38.

Figure 40:
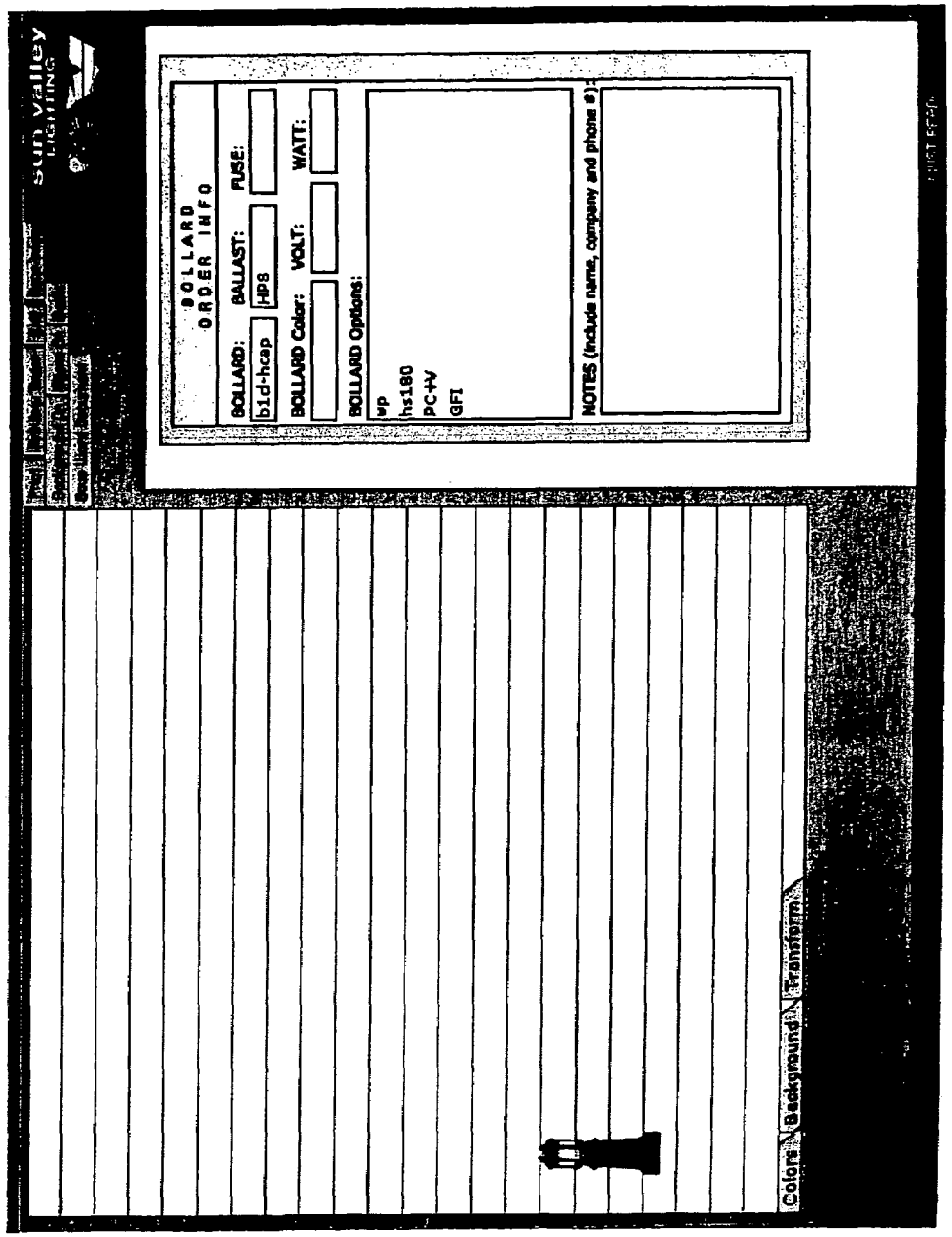
FIG. 40 shows an on-screen display illustrating operator selection of the system's order information of FIG. 9.

Once the complete bollard luminaire is selected, the embodiment of FIG. 9 allows for selection of a number of global options including display of order information 906. One such possible display is shown in FIG. 40.

Figure 39:
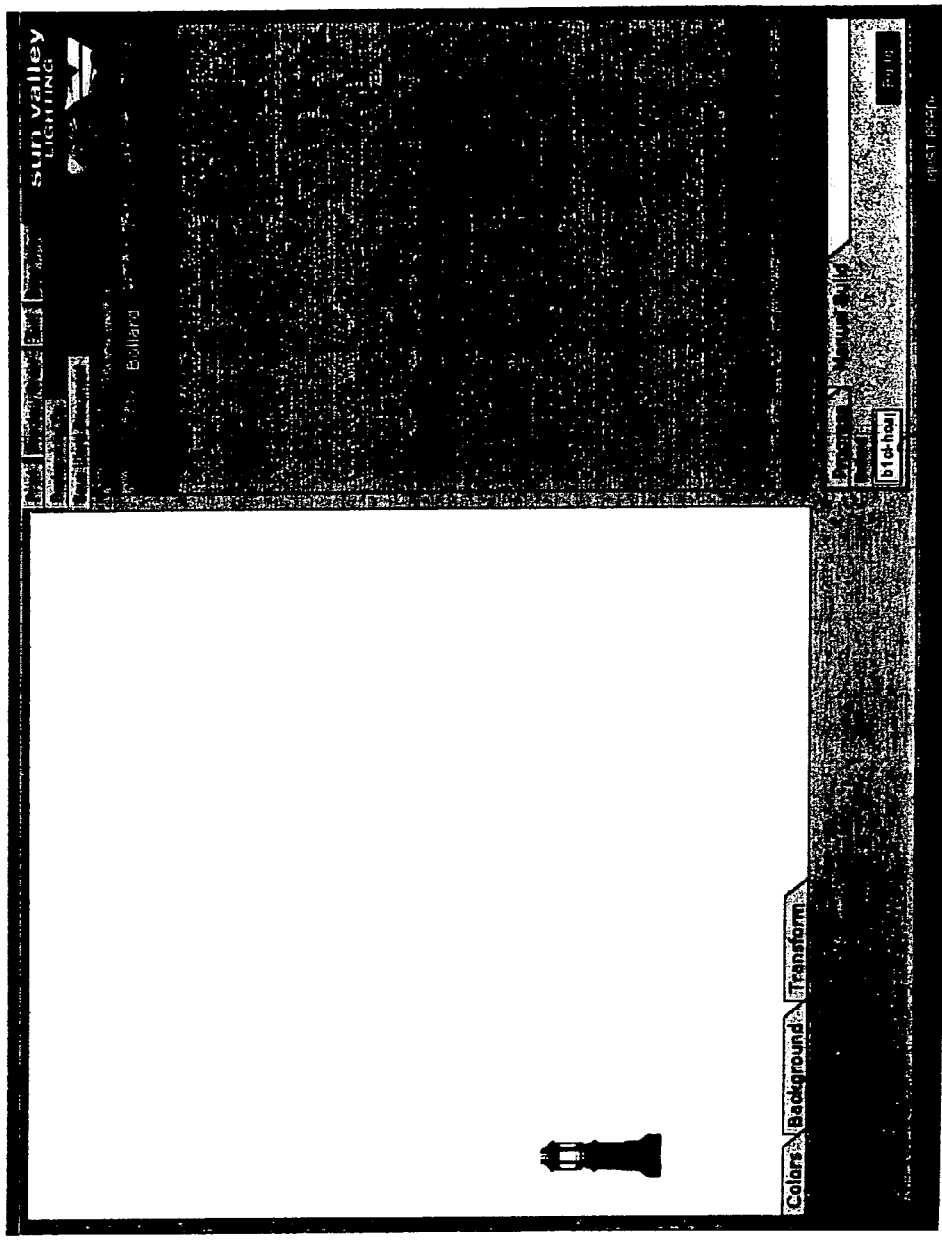
FIG. 39 shows an on-screen display illustrating operator selection of the system's manual build section of FIG. 9.

This particular embodiment of the invention also allows for accelerated selection via entry of part numbers rather than visual selection. This feature is called "manual build." FIG. 39 shows a "manually built" bollard via entry of its part number "blcl-hcap" 3902. FIG. 7 shows a flow diagram outlining the steps of the "manual build" feature. FIG. 10 and FIG. 11 show the steps of the "manual build" feature when selecting a wall mount or ceiling mount, respectively.

After one or more luminaires are selected, their parts may be changed or moved, i.e. transformed, further luminaires may be added, or selected luminaires may be deleted. FIGS. 41, 42, 43 and 44 show possible interfaces and displays for transforming parts, assigning them to selected luminaires, and adding and deleting luminaires.

Figure 41:
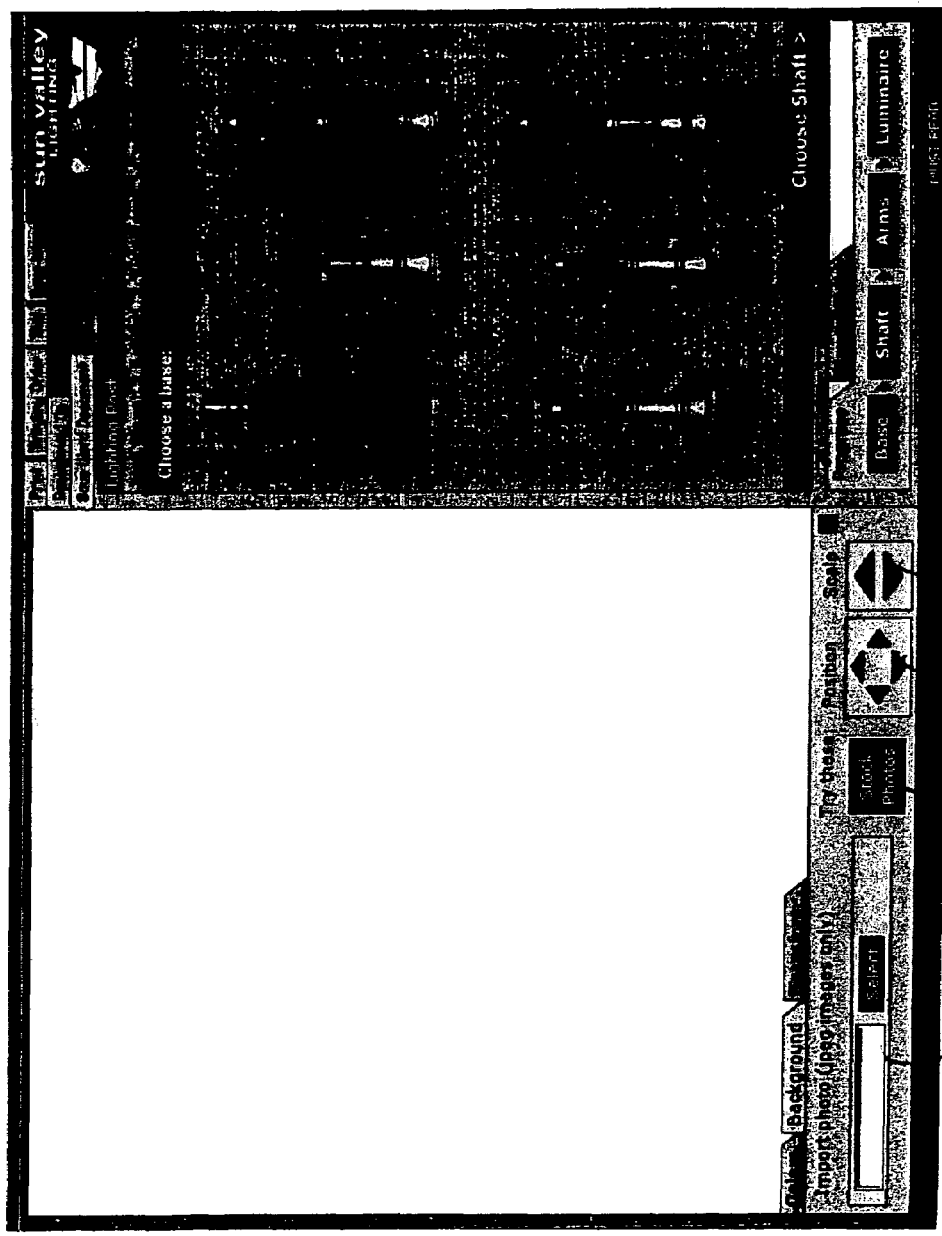
FIG. 41 shows an on-screen display illustrating operator selection of the system's selectable site settings of FIG. 12.
Figure 42:
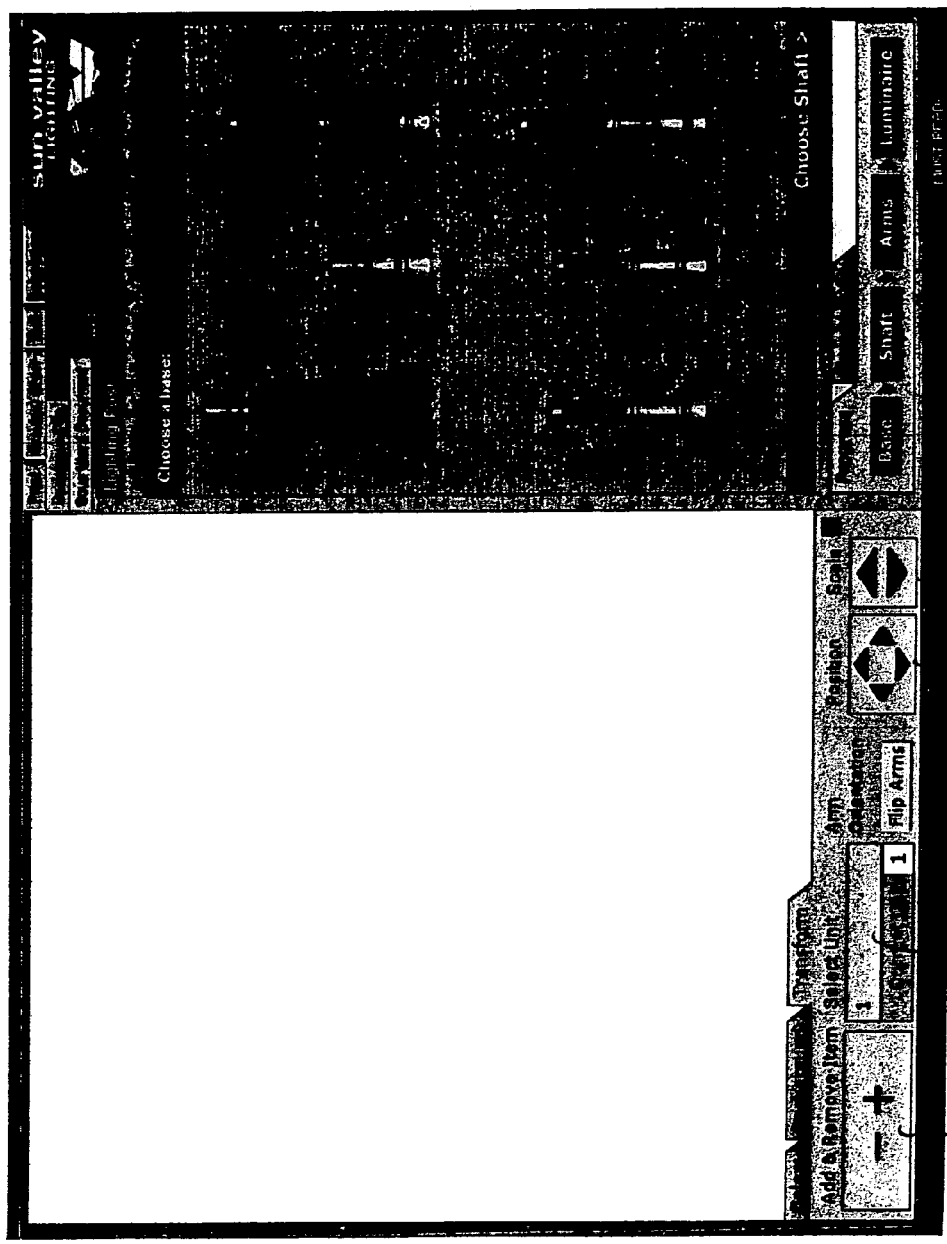
FIG. 42 shows an on-screen display illustrating operator selection of the system's transform settings of FIG. 13.
Figure 43:
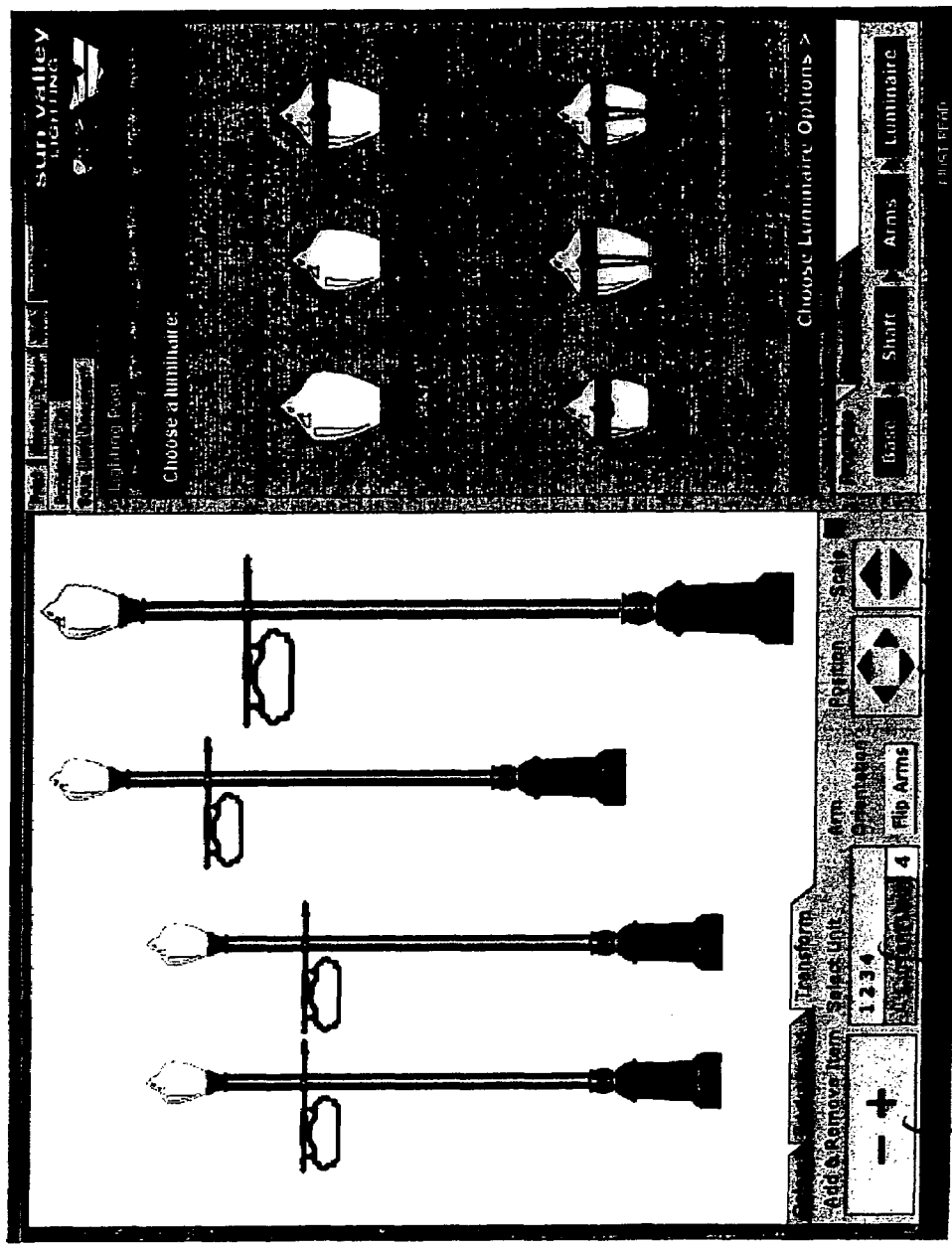
FIG. 43 shows an on-screen display illustrating another aspect of operator selection of the system's transform settings of FIG. 13.
Figure 44:
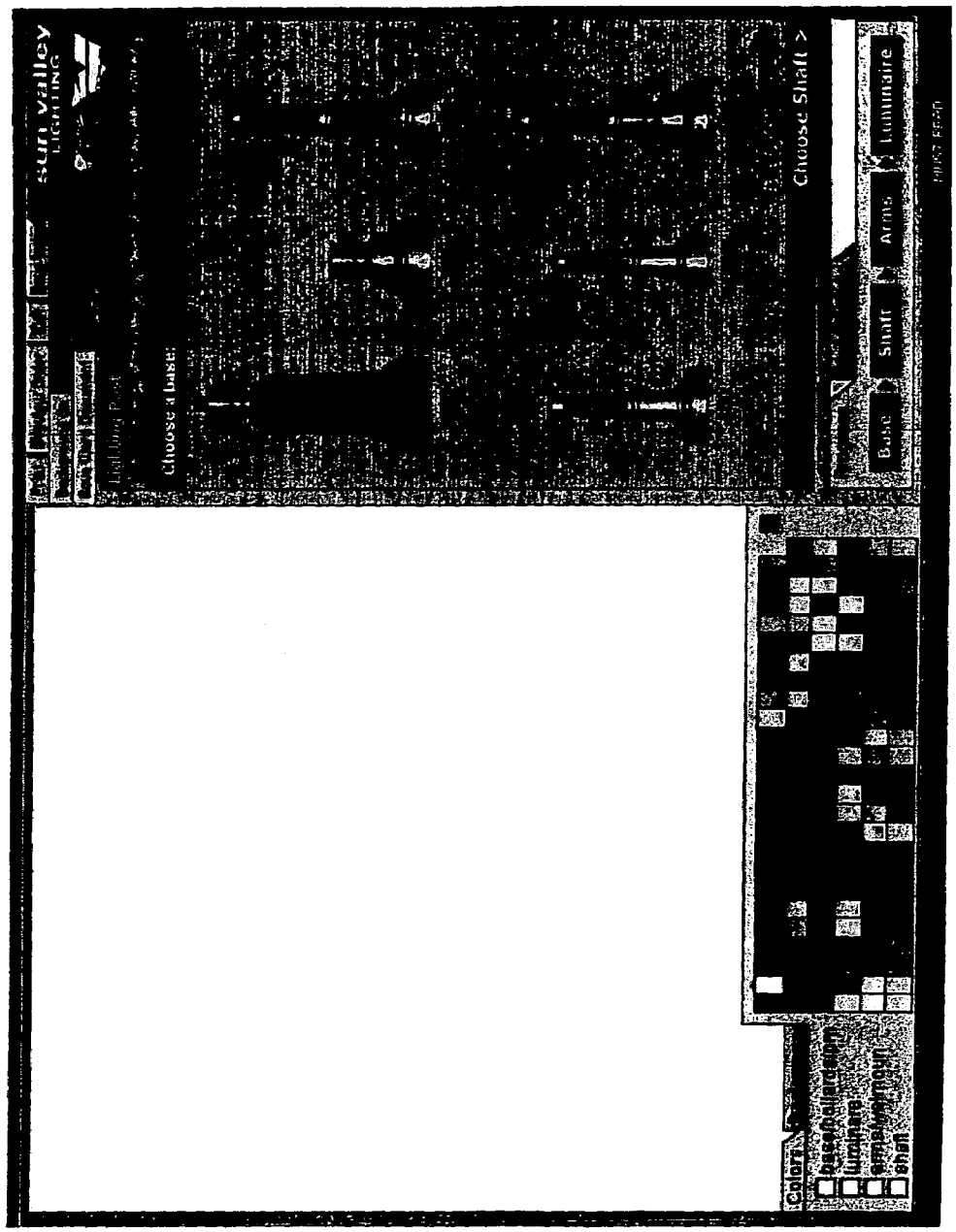
FIG. 44 shows an on-screen display illustrating operator selection of the system's color options of FIG. 14.

FIG. 41 shows controls for selecting sites within which luminaires may be displayed 4102, 4104. The operator can choose between using his or her own images of sites 4102 or selecting from a stock of photographs provided by the system 4104. FIG. 42 and FIG. 43 show controls for adding and removing items 4202, 4302, selecting luminaire units, 4304, positioning 4206, 4306 and scaling 4208, 4308 them and other controls. FIG. 44 shows controls for selecting colors for individual parts. A flow diagram outlining the process of color selection is shown in FIG. 14.

Once one or more luminaires have been selected, possibly transformed and scaled and optionally put into the context of a site, the system allows for storing the information usable for printing and/or electronic submission.

FIG. 45 shows instructions 4502 for saving in a Microsoft Word document order information 4504 for the design of a selected luminaire and transmitting the selected design to a luminaire seller or manufacturer. Also shown aside of order information 4504 are a background image 4506 and a set of selected luminaires 4508 projected into background image 4506. The background image including the selected luminaries could be a perspective view of a site selected for installation of luminaires 4508, as shown, or a plan view. Background image 4506 is created, for example, by taking a photograph of the selected site or by using a preexisting representation of the selected site from a brochure or the like. This photograph or preexisting brochure is scanned, formatted, and loaded into a memory 14 for use in creating an on-screen display. Memory 14 is described further below in connection with FIG. 46.

Figure 46:
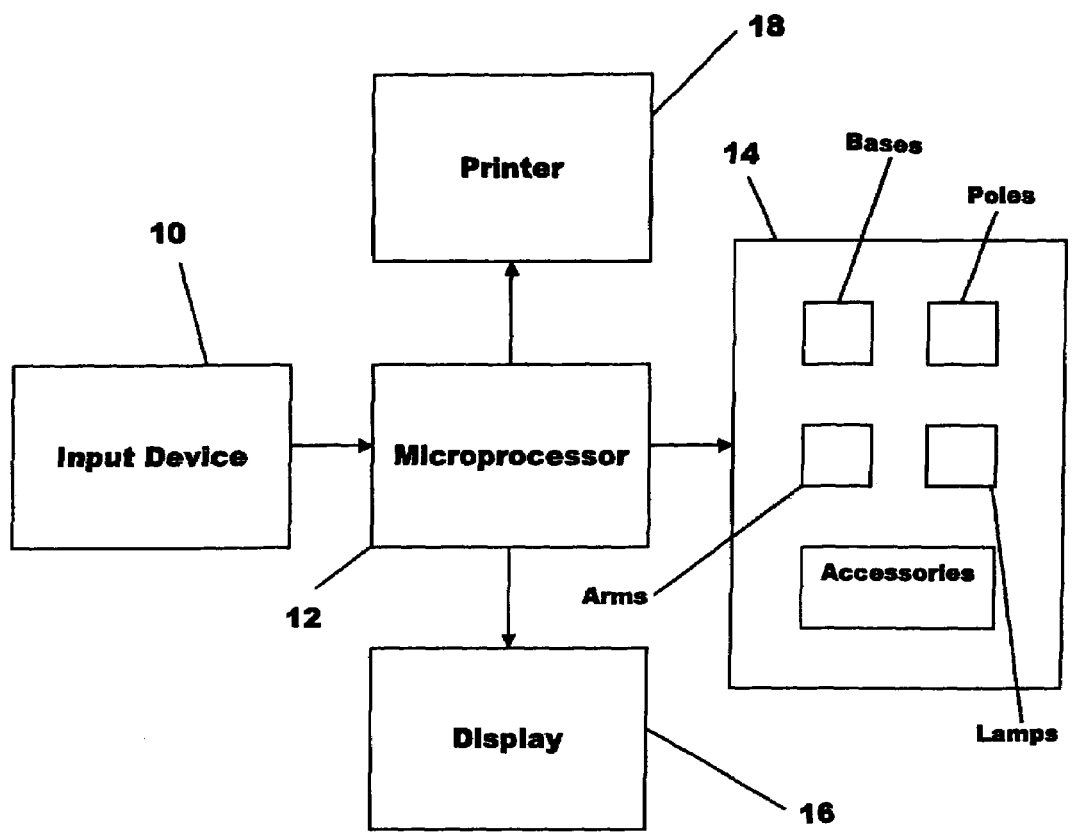
FIG. 46 shows the initial on-screen display when a system disk is installed in a computer.

FIG. 46 shows a computer for implementing the described operations and on-screen displays. An input device 10 such as a mouse or keyboard is connected to a microprocessor 12. Microprocessor 12 exchanges data with a memory 14 in which electronic files are stored. For example, the files could comprise a collection of different bases, a collection of different poles, a collection of different arms, a collection of different lamps, and accessories for the luminaries. The files are preferably images of the various parts adapted to fit together to form a virtual luminaire. Microprocessor 12 is programmed to carry out the steps described in FIGS. 2 to 14 and present the on-screen displays shown in FIGS. 15 to 44.

Specifically, the customer is led through the selection process by icons and text boxes on the screen of display 16. Other files could represent this data. At each step, the customer uses input device 10 to select one of the images representing parts shown on the screen. Microprocessor 12 could be programmed to limit the parts from one file that can be combined with parts from another file. For example, a pole may have a smaller or larger diameter than the base socket into which the pole fits. In such case, microprocessor 12 will not permit this combination of parts. A customer can select options to design and display a virtual luminaire. In this way the customer can easily create and change the design without having to build the luminaire.

Microprocessor 12 is programmed to superimpose the selected virtual luminaire on the selected background and change the size of the image to fit the background. A click and drag maneuver could be used to superimpose the virtual luminaire at the desired position on the background. A number of copies of the virtual luminaire could be superimposed on the background. If a perspective view is desired the sizes of successive copies are gradually reduced in sequence to give a three dimensional appearance to the image. Further, a color palette could be represented on the screen. To select a desired color for the virtual luminaire the customer simply clicks on the desired color swatch of the palette and the virtual luminaire assumes this color.

The microprocessor is also programmed to generate a purchase order (PO) from the customer selection. The PO is represented on the screen for editing, making a hard copy on a printer 18, and transmission to the manufacturer.

The relationship between the flow diagrams of FIGS. 1 to 14 and the on-screen displays is as follows:

1. The on-screen displays of FIGS. 15 to 24 are produced by the flow diagram of FIG. 2.
2. The on-screen displays of FIGS. 25 to 29 are produced by the flow diagram of FIG. 3.
3. The on-screen displays of FIGS. 30 to 33 are produced by the flow diagram of FIG. 4.
4. The on-screen displays of FIGS. 16 to 19 are produced by the flow diagram of FIG. 5.
5. The on-screen displays of FIGS. 20 and 21 are produced by the flow diagram of FIG. 6.
6. The on-screen displays of FIG. 15 et seq are produced by the flow diagram of FIG. 7.
7. The on-screen displays of FIGS. 34 to 36 are produced by the flow diagrams of FIGS. 8 and 10.
8. The on-screen displays of FIGS. 37 to 40 are produced by the flow diagram of FIG. 9.

9. The on-screen displays of FIGS. 25 to 29 are produced by the flow diagram of FIG. 11.

10. The on-screen displays of FIG. 41 is produced by the flow diagram of FIG. 12.

11. The on-screen displays of FIGS. 42 and 43 are produced by the flow diagram of FIG. 13.

12. The on-screen displays of FIG. 44 is produced by the flow diagram of FIG. 14.

The description above only lays out a limited set of embodiments of the invention. Modifications that are still within the scope of the invention may be made to the embodiments described above.

What is claimed is:

1. An apparatus for designing luminaires from sets of images of interchangeable parts such that one part from each set fits with one part from each of the other sets to form a complete luminaire, the apparatus comprising:
    a display device having a screen;
    a memory for storing images of the parts;
    a microprocessor programmed to display the stored images;
    an input device for selecting one part from each set required to form a complete luminaire; and
    the microprocessor being programmed to assemble on the screen an image of the complete luminaire from the selected parts.

2. The apparatus of claim 1, wherein the interchangeable parts include at least two of a set of poles, a set of bases, and a set of lamps, wherein the memory stores images of the at least two sets, and wherein the microprocessor is programmed to display and assemble on the screen the selected parts to form a complete luminaire from the said at least two sets.

3. A system for designing and ordering luminaires, comprising:
    a user interface including a display for selecting parts of a luminaire from different designs and for displaying a luminaire composed of the selected parts;
    a copy buffer capable of storing copies of the luminaire, usable for incorporating the luminaire into a document or a file that can be printed or submitted electronically; and
    a printer for printing images of luminaires composed of selected parts usable for submission of orders by hardcopy, or for filing of hardcopies including of orders submitted electronically.

4. The system of claim 3, wherein the display allows the luminaire to be viewed in the context of a selectable site.

5. The system of claim 4, wherein one or more copies of the luminaire can be positioned, moved, and scaled within the selected site.

6. The system of claim 4
    wherein the printer can print images of luminaires within or without the selected site.

7. A method for designing luminaires from at least two sets of interchangeable parts such that one part from each set fits one part from each of the other sets to form a complete luminaire, the method comprising:
    receiving input via a computer interface, the input representing a selection of interchangeable parts from each set;
    displaying a likeness of the complete luminaire or a partially complete luminaire composed of the selection of interchangeable parts; and
    storing the likeness of the complete luminaire or the partially complete luminaire for the purpose of incorporating said likeness of the complete luminaire or the partially complete luminaire into a document or a file that can be printed or submitted electronically.

8. A method for displaying at an installation site a virtual luminaire, the method comprising:
    scanning an image of the site to produce a digital file;
    loading the digital file into a memory;
    storing images of luminaire parts in the memory as digital files;
    selecting some of the luminaire parts;
    forming a virtual luminaire from the selected parts; and
    displaying the virtual luminaire and the site image together.

9. The method of claim 8, additionally comprising adjusting the relative sizes of the virtual luminaire and site image.

10. The method of claim 8, additionally comprising adjusting the color of the virtual luminaire and/or the site image.

11. The method of claim 8, additionally comprising adjusting the position of the virtual luminaire relative to the site image.

12. An apparatus for designing luminaires from sets of images of interchangeable parts such that one part from each set fits with one part from each of the other sets to form a complete luminaire, the apparatus comprising:
    a display device having a screen;
    a memory for storing images of the parts;
    a microprocessor programmed to display the stored images;
    an input device for selecting one part from each set required to form a complete luminaire; and
    the microprocessor being programmed to assemble on the screen an image of the complete luminaire from the selected parts;
    wherein the sets of images of interchangeable parts include at least two sets from a group of a set of poles, a set of bases, and a set of lamps and wherein the microprocessor is programmed to display and assemble on the screen the selected parts to form a complete luminaire.

13. An apparatus for designing luminaires from sets of images of interchangeable parts such that one part from each set fits with one part from each of the other sets to form a complete luminaire, the apparatus comprising:
    a display device having a screen;
    a memory for storing images of the parts;
    a microprocessor programmed to display the stored images;
    an input device for selecting one part from each set required to form a complete luminaire; and
    the microprocessor being programmed to assemble on the screen an image of the complete luminaire from the selected parts;
    wherein the microprocessor is programmed to display the stored images such that all the selected parts of one set are displayed at one time to the exclusion of the other sets.

14. A system for designing and ordering luminaires, comprising:
    a user interface including a display for selecting parts of a luminaire from different designs and for displaying a luminaire composed of the selected pans;
    a copy buffer capable of storing copies of the luminaire, usable for incorporating the luminaire into a document or a file that can be printed or submitted electronically; and
    a printer for printing images of luminaires composed of selected parts usable for submission of orders by hardcopy, or for filing of hardcopies including of orders submitted electronically;

wherein the display allows the luminaire to be viewed in the context of a selectable site and wherein the selectable site is selected either from digital pictures of sites provided by a luminaire seller or manufacturer or digital pictures provided by a customer or operator.

15. A system for designing and ordering luminaires, comprising:

a user interface including a display for selecting parts of a luminaire from different designs and for displaying a luminaire composed of the selected parts;

a copy buffer capable of storing copies of the luminaire, usable for incorporating the luminaire into a document or a file that can be printed or submitted electronically; and a printer for printing images of luminaries composed of selected parts usable for submission of orders by hardcopy, or for filing of hardcopies including of orders submitted electronically;

wherein the document or file is a Microsoft Word document or file that is submitted by electronic mail.

16. A method for displaying at an installation site a virtual luminaire, the method comprising:

scanning an image of the site to produce a digital file;

loading the digital file into a memory;

storing images of luminaire parts in the memory as digital files;

selecting some of the luminaire parts;

forming a virtual luminaire from the selected parts; displaying the virtual luminaire and the site image together; and photographing the site to produce the scanned site image.

17. An apparatus for designing luminaires from sets of images of parts to form a complete luminaire, the apparatus comprising:

a display device having a screen;

a memory for storing the images of the parts;

a microprocessor programmed to display the stored images;

an input device for selecting a part from each set required to form a complete luminaire; and the microprocessor being programmed to assemble on the screen an image of the complete luminaire from the selected parts;

wherein at least one set has images of at least two or more interchangeable parts that fit with at least one part from each of the other sets to form a complete luminaire, and wherein the microprocessor is programmed to display and assemble on the screen the selected parts to form a complete luminaire.

* * * * *

UNITED STATES PATENT AND TRADEMARK OFFICE
CERTIFICATE OF CORRECTION

PATENT NO.       : 7,610,180 B1
APPLICATION NO.  : 11/188290
DATED            : October 27, 2009
INVENTOR(S)      : Angel Orellana Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 789 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,610,180 B1 |
| APPLICATION NO. | : 11/188290 |
| DATED | : October 27, 2009 |
| INVENTOR(S) | : Angel M. Orellana |

It is certified that error appears in the above-identified patent and that said Letters Patent is hereby corrected as shown below:

In the Figures

Figure 45, Sheet 45 of 46 — Delete Drawing Sheet 45 and substitute therefore the Drawing Sheet, consisting of Fig. 45, as shown on the attached page

In the Claims

Column 10, line 59 — Delete "pans" Insert -- parts --

Column 11, line 15 — Delete "luminaries" Insert -- luminaires --

Signed and Sealed this
Ninth Day of August, 2011

David J. Kappos
*Director of the United States Patent and Trademark Office*

SAVING A WORD DOCUMENT

TO SAVE THE DESIGN AND ORDERING INFORMATION YOU CREATED INTO A WORD DOCUMENT PLEASE DO THE FOLLOWING:

1. CLOSE THIS ACROBAT PROGRAM (PRINT THESE INSTRUCTIONS FIRST IF YOU NEED TO)
2. CLICK ON THE MAXIMIZE BUTTON (SEE BELOW).
3. FIND THE "PRINT SCREEN" BUTTON ON YOUR KEYBOARD AND PRESS IT.
4. OPEN A NEW MICROSOFT WORD DOCUMENT.
5. SELECT "EDIT" FROM THE TOOLS MENU, SELECT "PASTE" AND YOU SHOULD SEE SOMETHING SIMILAR TO THE IMAGE AT THE BOTTOM.
6. NOW YOU CAN SAVE THIS DOCUMENT AND E-MAIL TO SUN VALLEY LIGHTING (info@sunvalleylighting.com) OR YOU CAN E-MAIL IT TO YOUR CUSTOMER.

FIG. 45

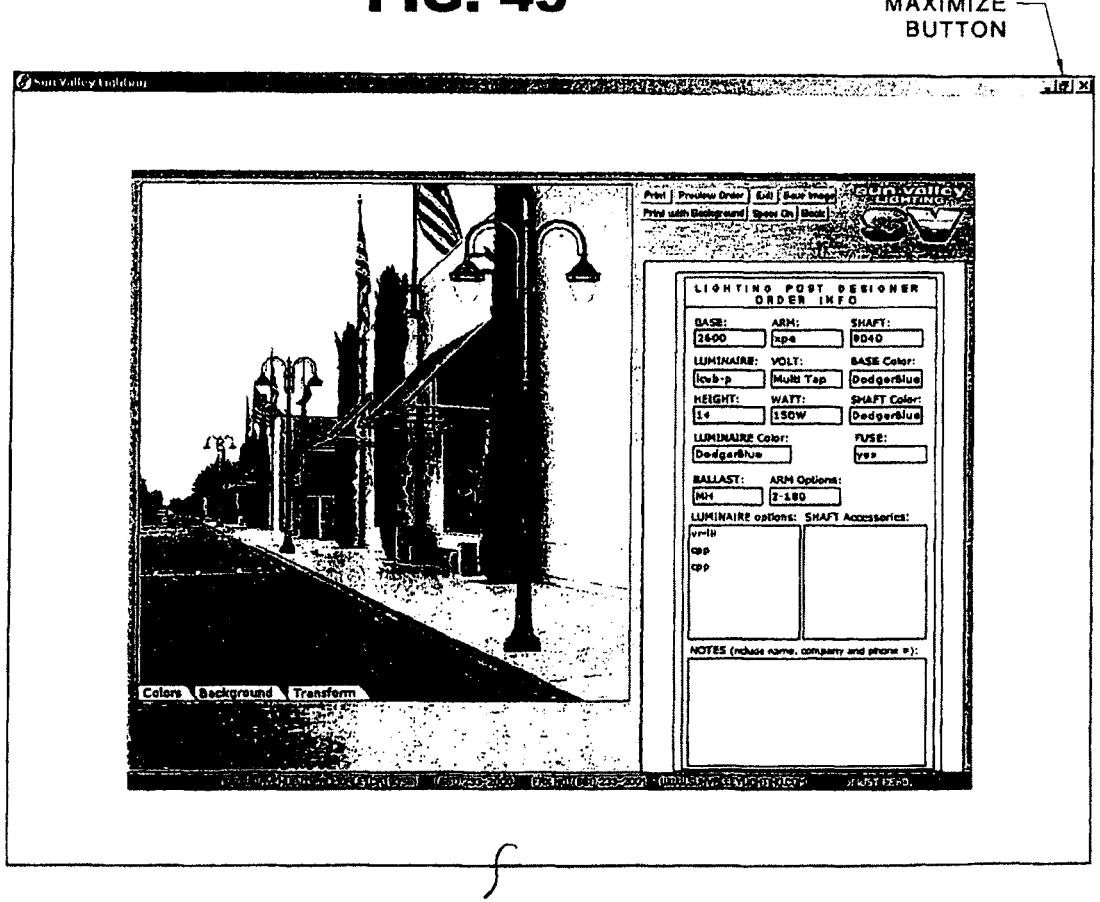

MAXIMIZE BUTTON

4562